Aug. 17, 1943.  D. BALK ET AL  2,326,746
BIAS CUTTING MACHINERY
Filed Sept. 12, 1942  15 Sheets-Sheet 1
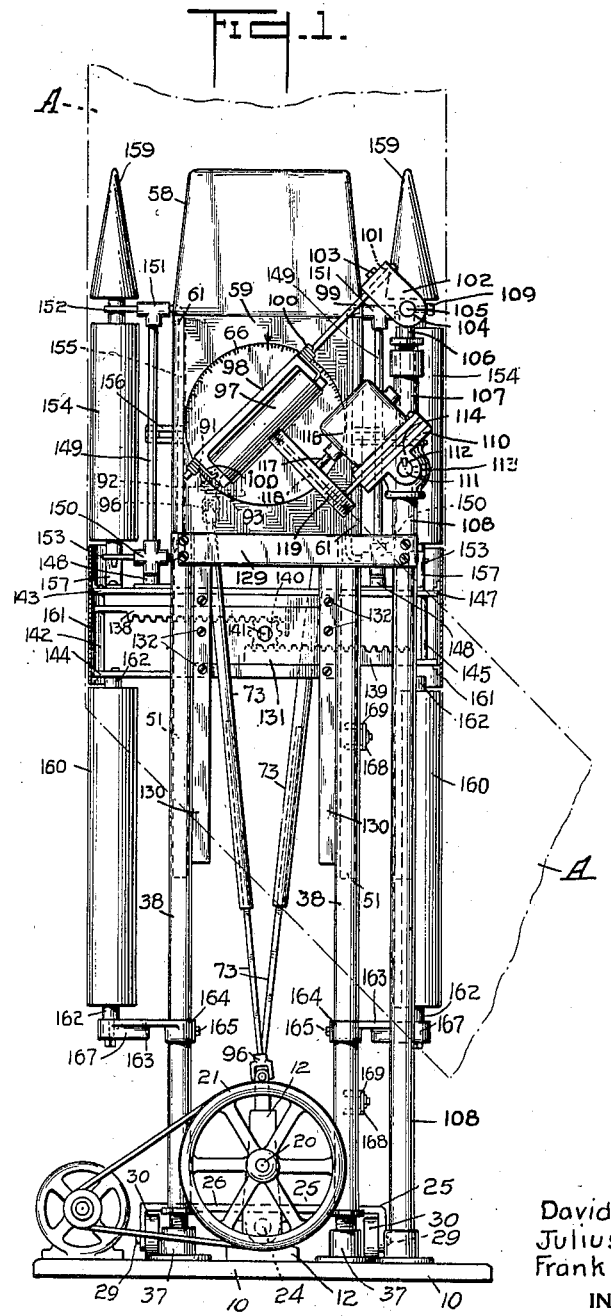
David Balk
Julius Katz
Frank P. Majoros
INVENTORS
BY 
their ATTORNEY.

Aug. 17, 1943.　　D. BALK ET AL　　2,326,746
BIAS CUTTING MACHINERY
Filed Sept. 12, 1942　　15 Sheets-Sheet 3
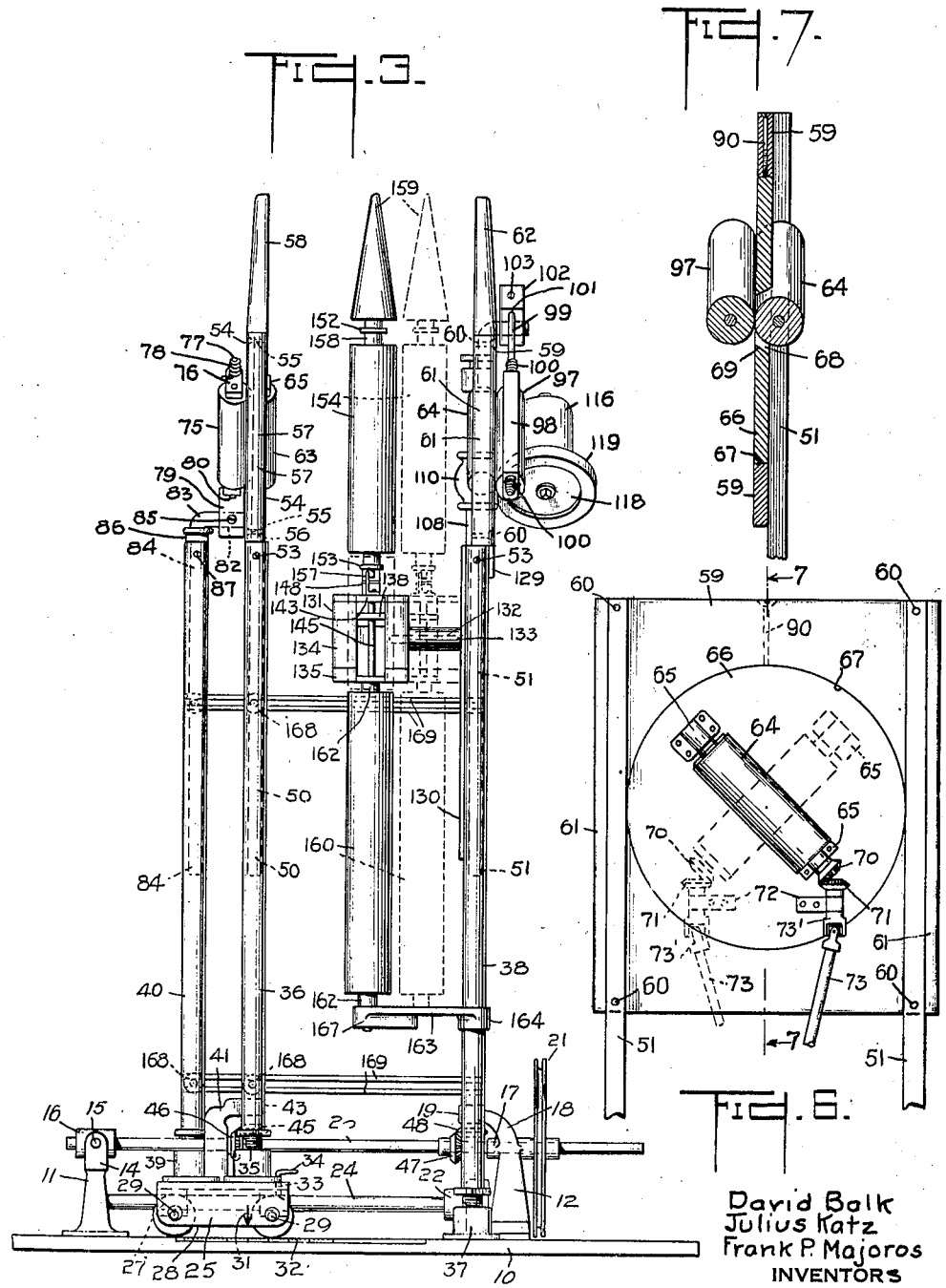
David Balk
Julius Katz
Frank P. Majoros
INVENTORS
BY 
their ATTORNEY Aug. 17, 1943.                D. BALK ET AL                 2,326,746
                            BIAS CUTTING MACHINERY
                    Filed Sept. 12, 1942        15 Sheets-Sheet 4
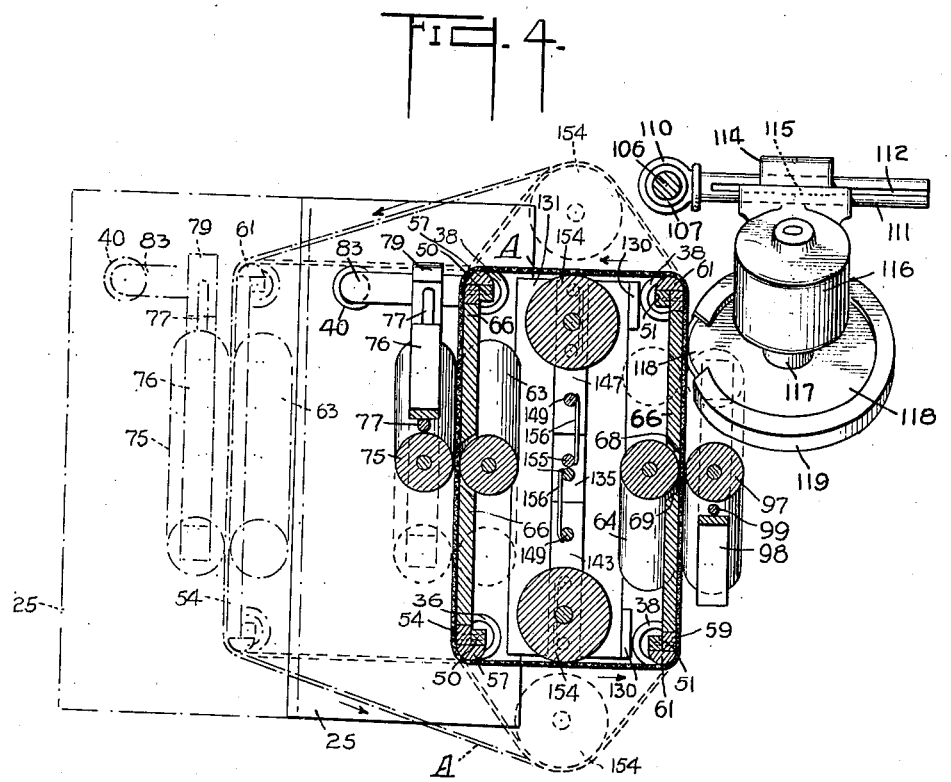
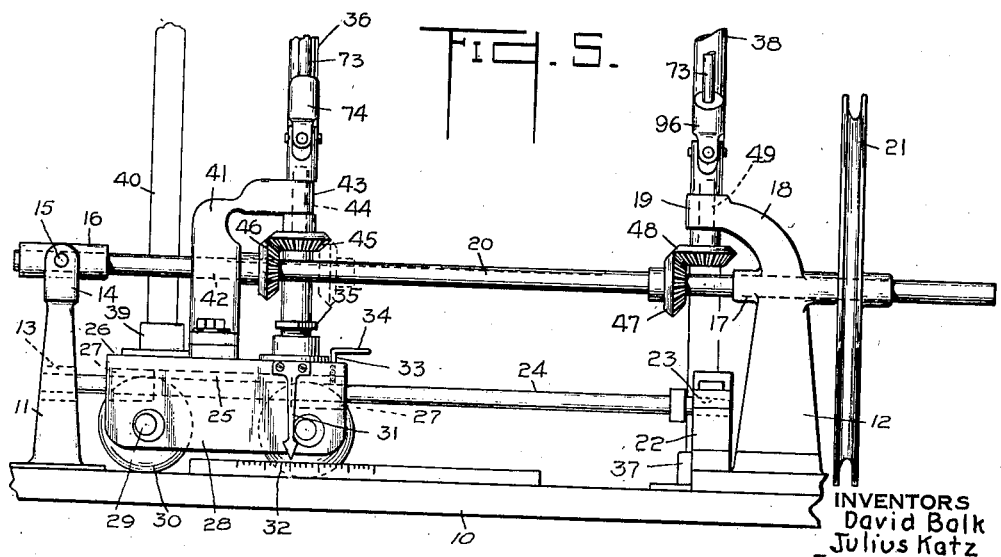
INVENTORS
David Balk
Julius Katz
Frank P. Majoros
BY
ATTORNEY.

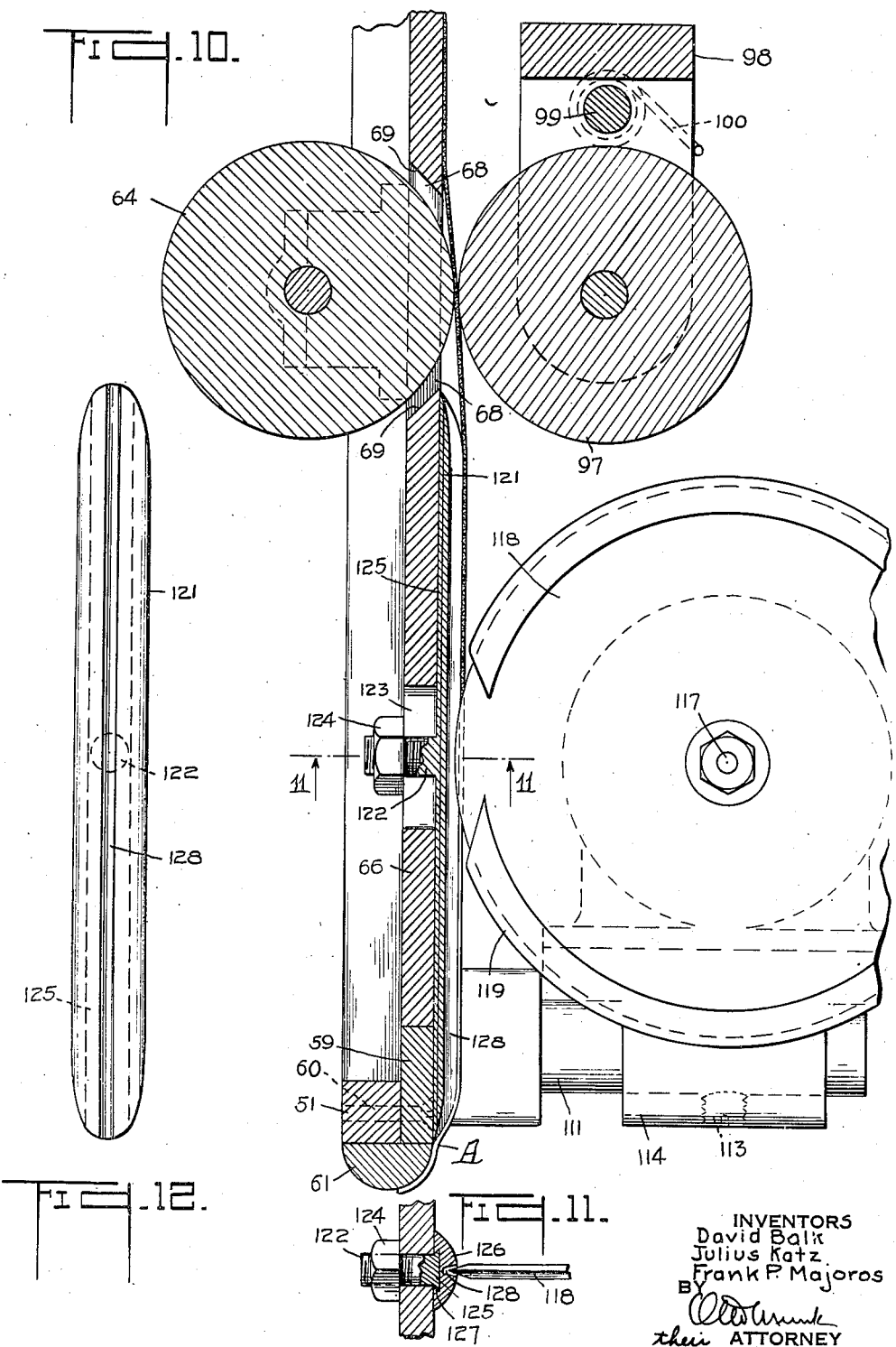

Aug. 17, 1943.  D. BALK ET AL  2,326,746
BIAS CUTTING MACHINERY
Filed Sept. 12, 1942  15 Sheets-Sheet 6
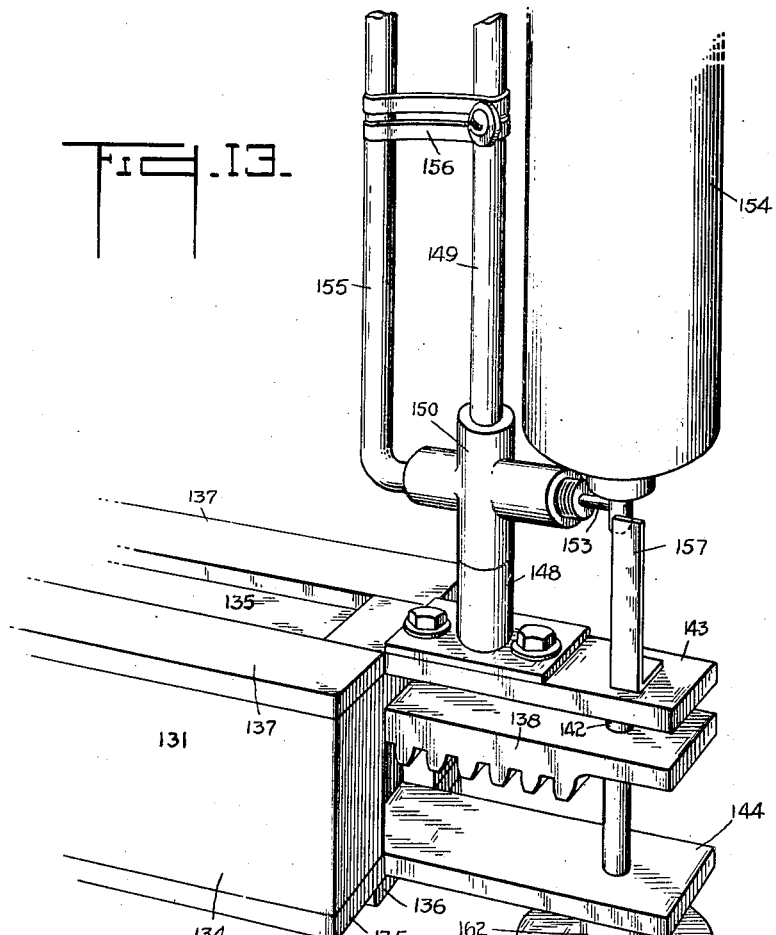
David Balk
Julius Katz
Frank P. Majoros
INVENTORS
BY
their ATTORNEY.

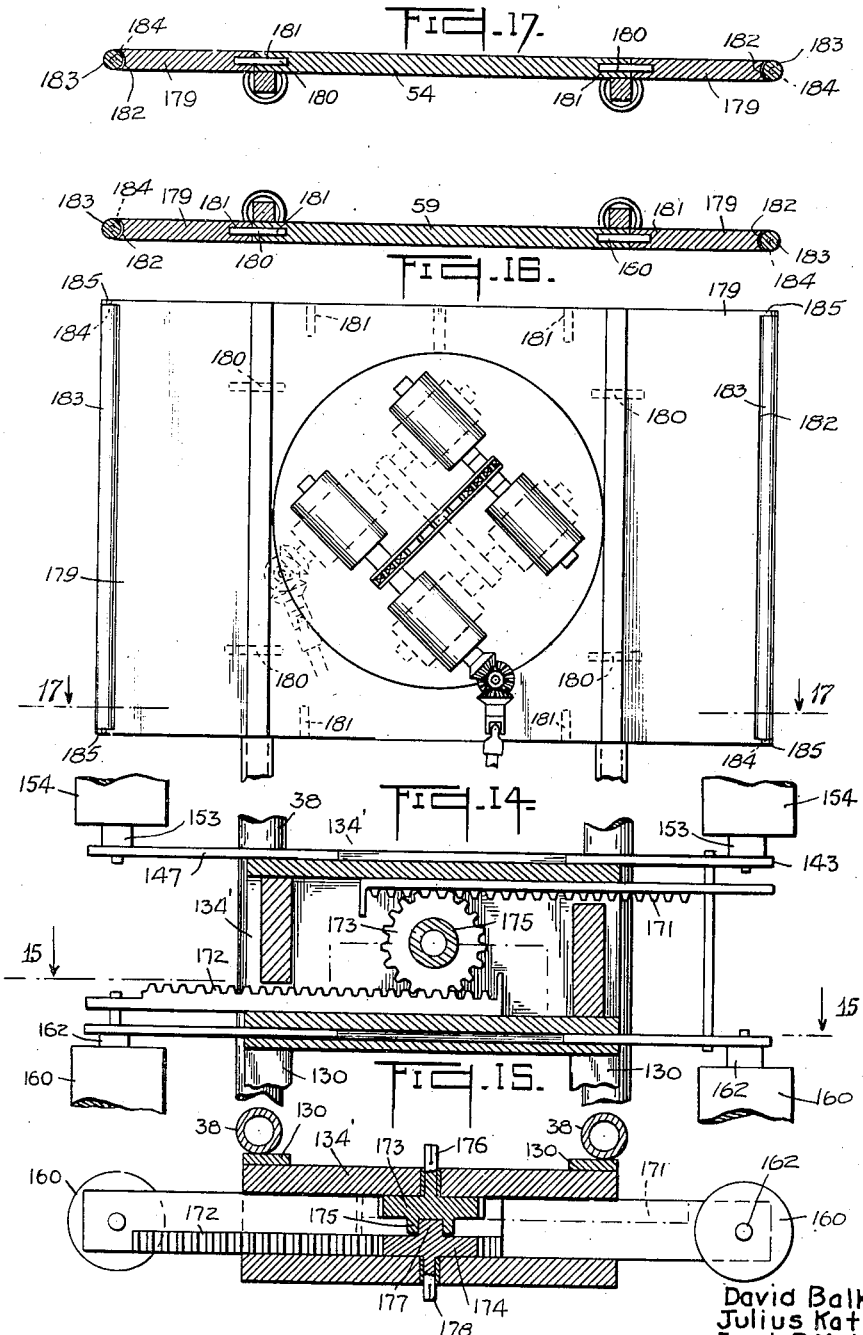

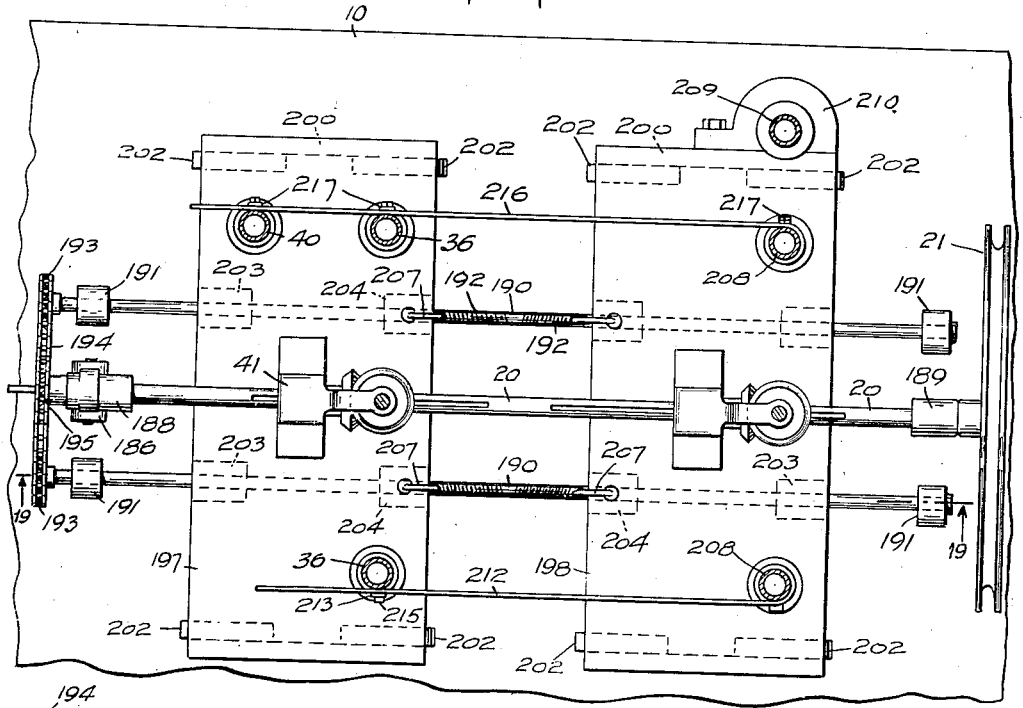

Aug. 17, 1943.  D. BALK ET AL  2,326,746
BIAS CUTTING MACHINERY
Filed Sept. 12, 1942  15 Sheets-Sheet 9
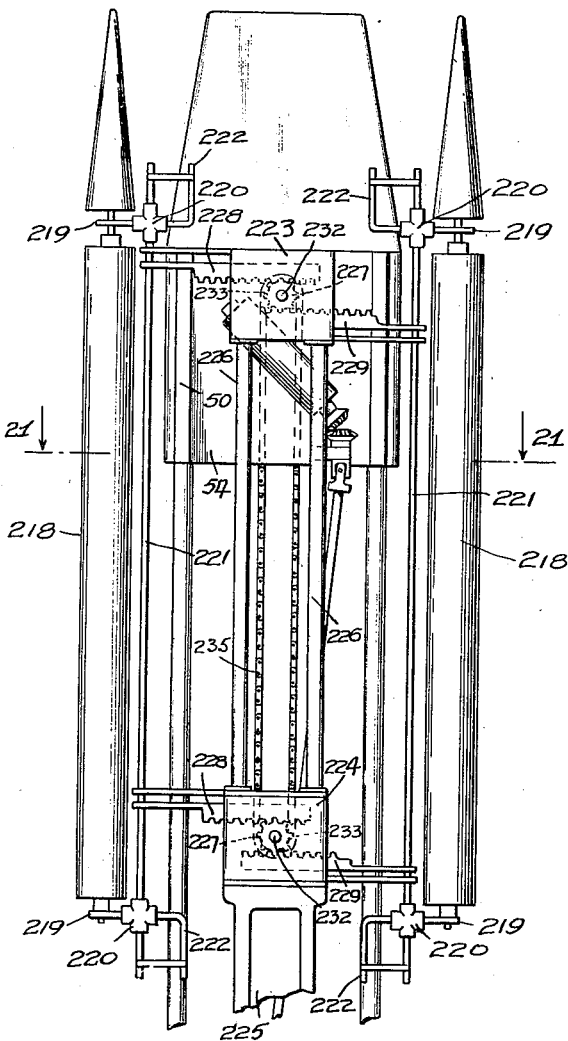
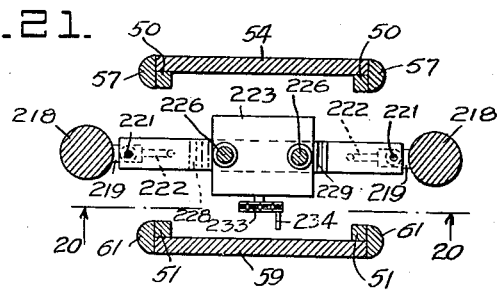
David Balk
Julius Katz
Frank P. Majoros
INVENTORS
BY
their ATTORNEY.

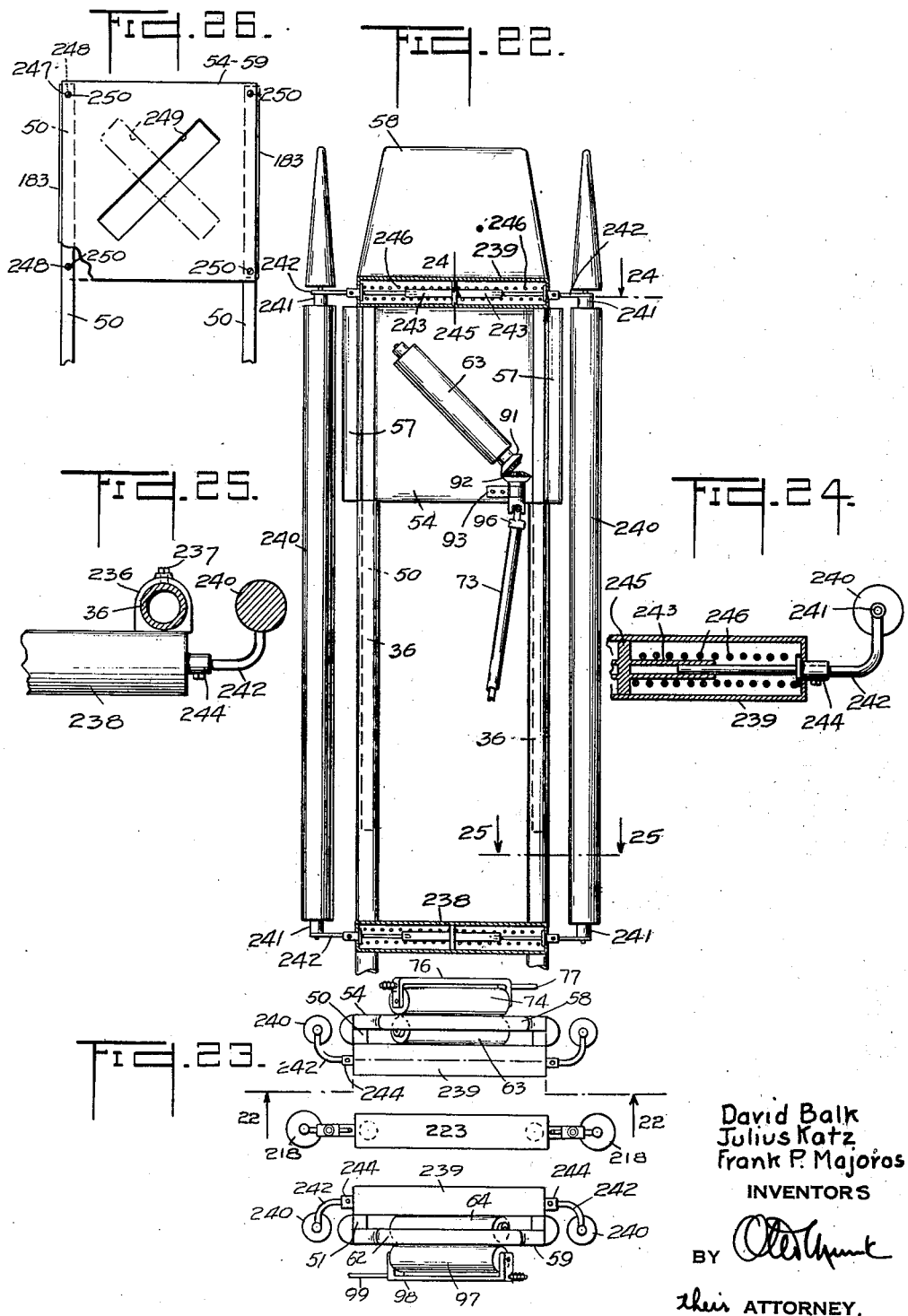

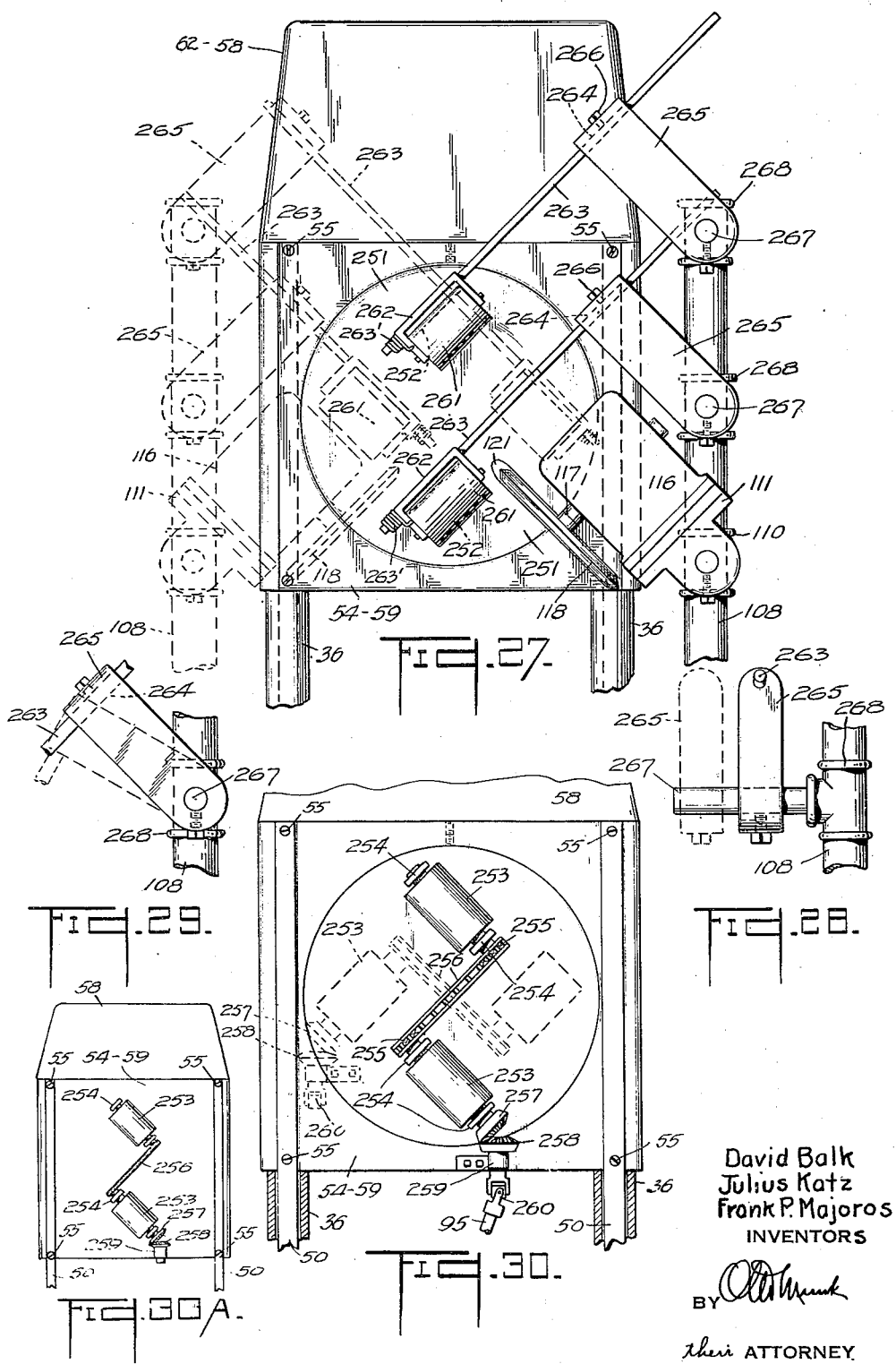

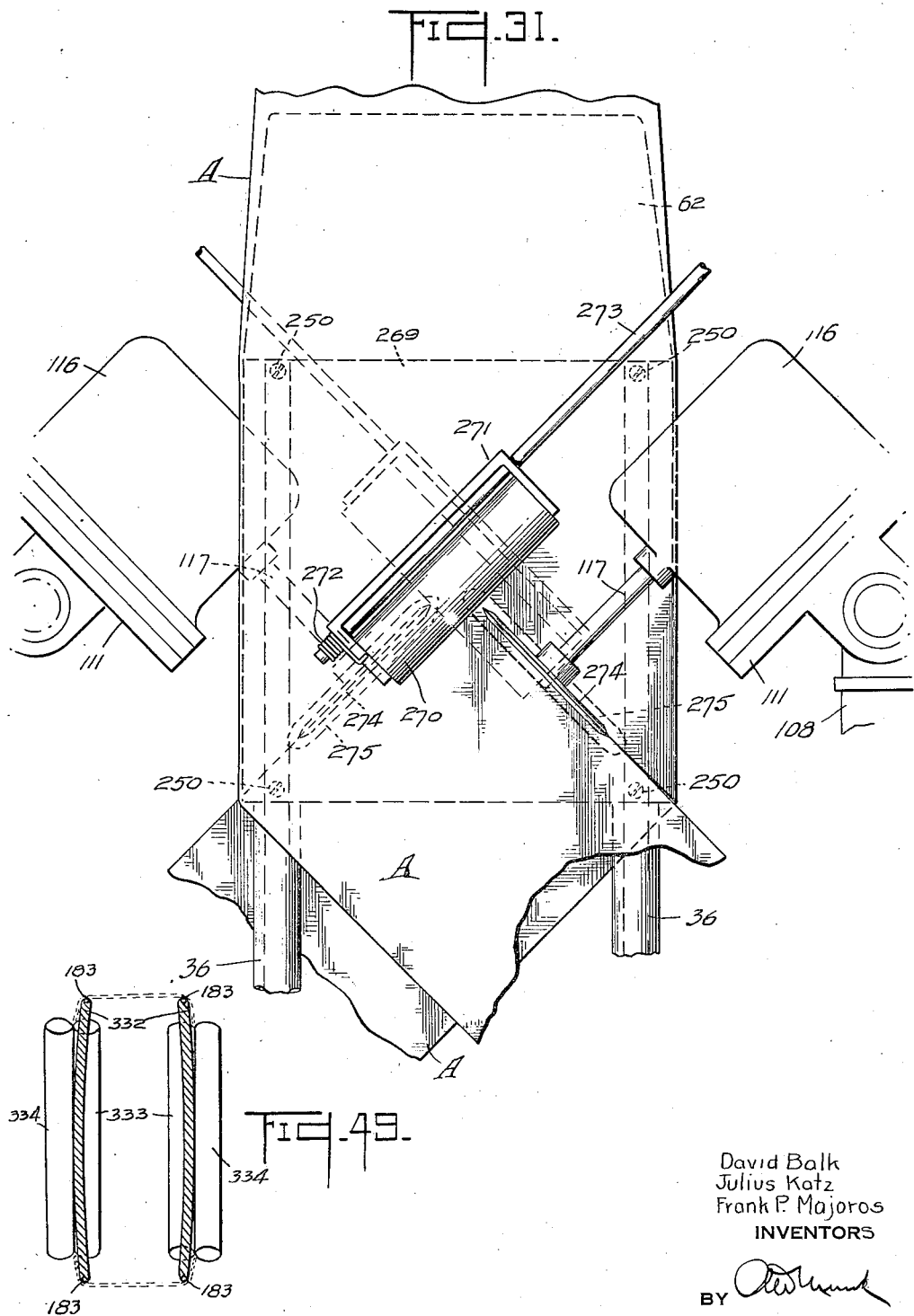

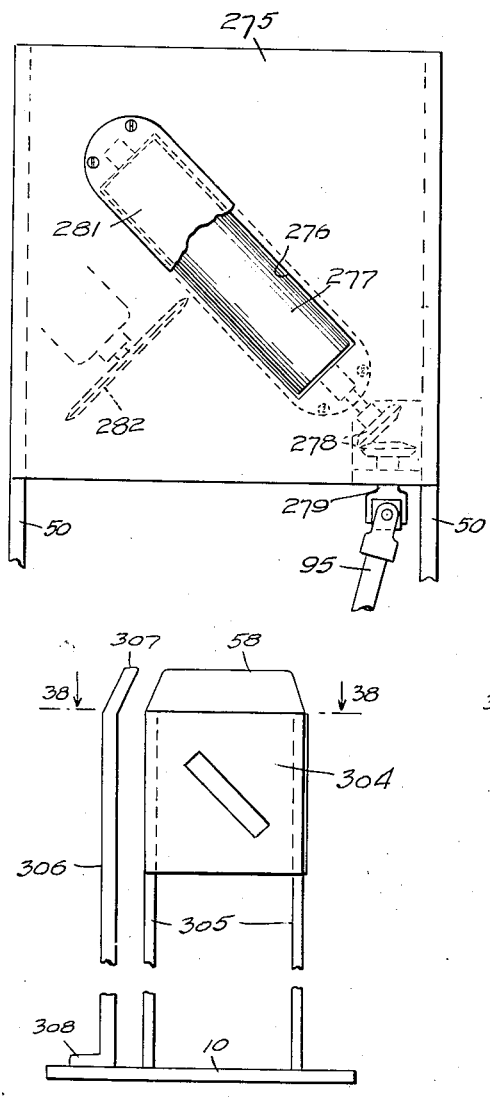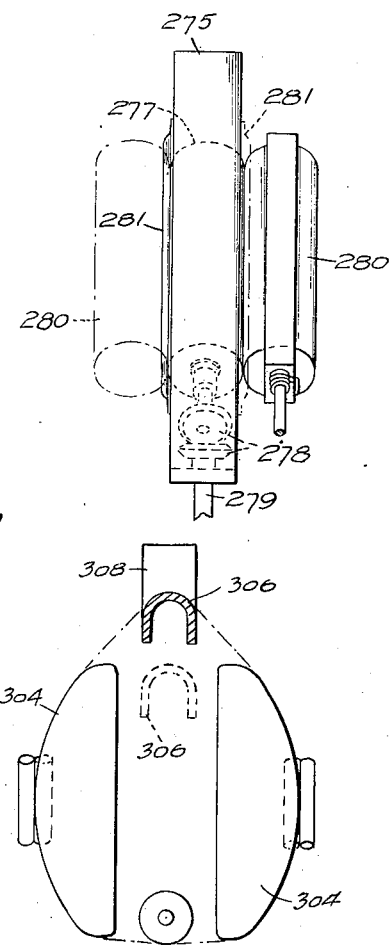

Aug. 17, 1943.  D. BALK ET AL  2,326,746
BIAS CUTTING MACHINERY
Filed Sept. 12, 1942  15 Sheets-Sheet 14
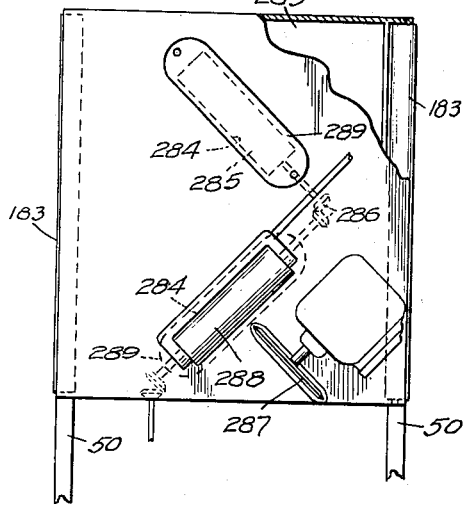
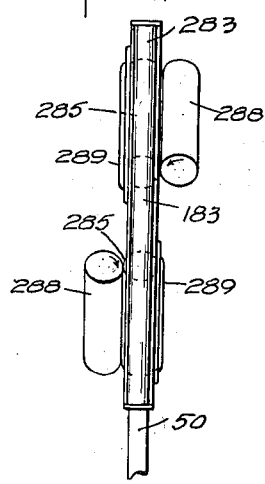
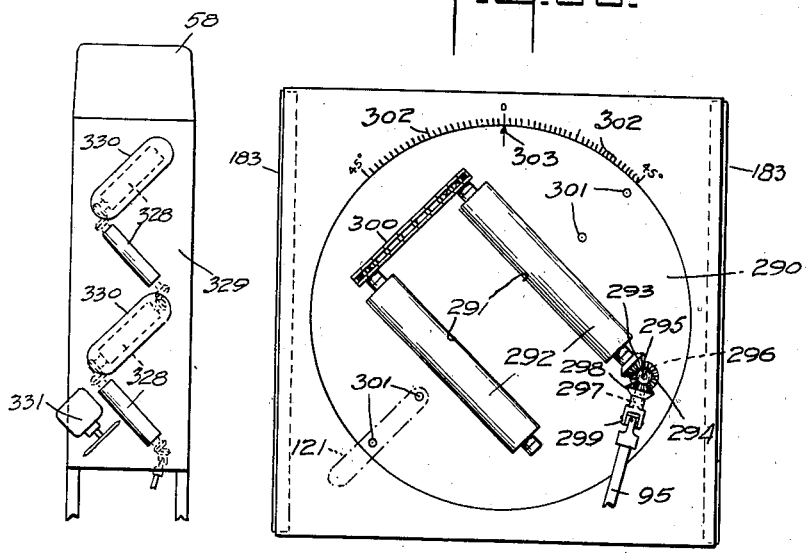
David Balk
Julius Katz
Frank P. Majoros
INVENTORS
BY
their ATTORNEY.

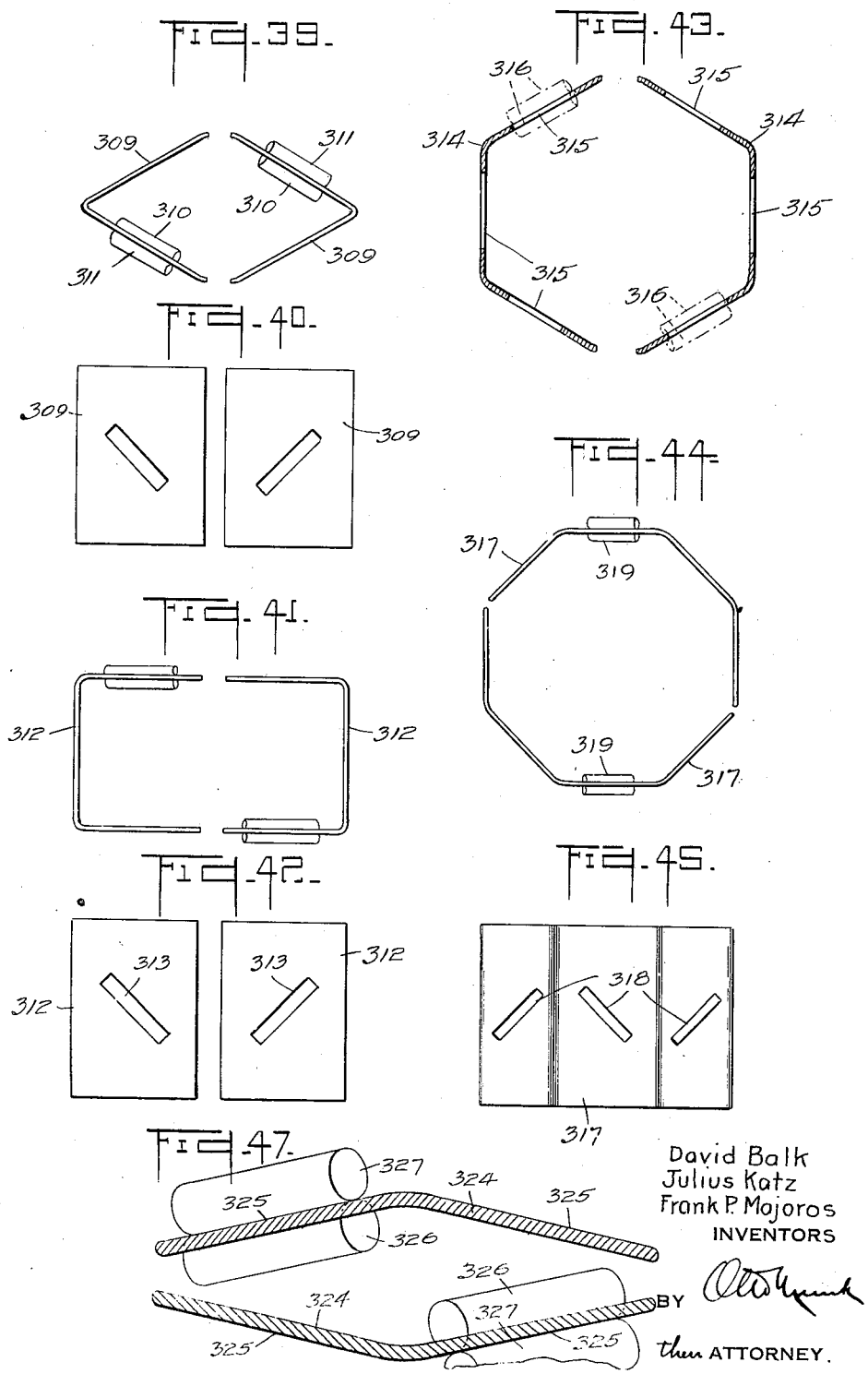

Patented Aug. 17, 1943

2,326,746

UNITED STATES PATENT OFFICE 2,326,746

BIAS CUTTING MACHINERY

David Balk and Julius Katz, Bronx, and Frank P. Majoros, Brooklyn, N. Y., assignors, by direct and mesne assignments, to Superba Manufacturing Co., Inc., New York, N. Y., a corporation of New York Application September 12, 1942, Serial No. 458,152

61 Claims. (Cl. 164—61)

This invention relates to improvements in bias cutting machines of the type used for cutting strips spirally from tubular fabrics or textile materials.

The invention has for its object to provide a bias cutting machine of the character hereinafter described, which is extremely simple in construction and efficient in operation and which is adjustable to accommodate wide variations in the diameter of the tubular material.

A further object of the present invention is to provide means capable of adjustment to vary the angle of bias at which the material is cut.

A further object of the present invention is to provide extensible supporting standards for the mandrel sections to allow for very large diameter tubular materials, the bias cut strip of which is necessarily of a width requiring considerable height from the base to the knife in order to be withdrawn from the machine.

And a still further object of the invention is to provide means whereby slight adjustment of the cutting and feeding mechanism allows either clockwise or counter-clockwise movement of the tubular material for the purpose of cutting the seam of the tubular material at the most efficient angle.

And a still further object of this invention is to provide a plurality of mandrel sections, which may be combined to form a single mandrel over which tubular material is spirally fed and cut to form a strip, and which may be used separately to handle a plurality of tubings for cutting strips having the same or different bias.

The objects of the invention are accomplished by means of various combinations and arrangements of parts hereinafter described, set forth in the appended claims and illustratively exemplified in the accompanying drawings, in which:

Figure 1 is a side elevational view of one embodiment of the bias cutting machine, looking in the direction of the cutting element;

Figure 2 is a side elevational view of the opposite side of the same machine;

Figure 3 is a front elevational view of the bias cutting machine;

Figure 4 is a substantially transverse sectional view taken on line 4—4 of Figure 2;

Figure 5 is a front elevational view of the supporting part of the machine showing the movable carriage for one mandrel section, a graduated scale for setting the movable carriage to accommodate the machine to various tube diameters;

Figure 6 is an elevational view of the back of a mandrel section showing the adjustable plate and support for the driving feed roller;

Figure 7 is a substantially longitudinal sectional view of the mandrel and plate taken on line 7—7 of Figure 6;

Figure 8 is a perspective view of a portion of one standard and the extensible support for the mandrel section carried by the standard;

Figure 9 is a substantially transverse sectional view of a standard and a top plan view of a supporting sector for the compensating rollers;

Figure 10 is a substantially transverse sectional view of a mandrel section, feeding rollers and cutting attachment;

Figure 11 is a sectional view taken on lines 11—11 of Figure 10;

Figure 12 is an elevational view of the cutting guide;

Figure 13 is a perspective view of the adjustable supporting means for the compensating rollers;

Figure 14 is an elevational view of the inside of gear and rack box, showing the supporting bearings for the compensating rollers;

Figure 15 is a substantially transverse sectional view of the gear and rack taken on lines 15—15 of Figure 14;

Figure 16 is a back elevational view of a mandrel section showing extension sections for the mandrel section;

Figure 17 is a substantially transverse sectional view of a pair of mandrel sections taken on line 17—17 of Figure 16;

Figure 18 is a top plan elevational view of a modified supporting bed and adjustable carriages for two movable mandrel sections;

Figure 19 is a substantially longitudinal sectional view of the modified supporting bed and carriages taken on line 19—19 of Figure 18;

Figure 20 is an inside elevational view, looking in the direction of arrows 20—20 of Figure 21, of a modified arrangement of compensating rollers, showing upper and lower supporting units for the rollers and means for changing the relative positions of the rollers;

Figure 21 is a substantially transverse sectional view of the modified arrangement taken on line 21—21 of Figure 20;

Figure 22 is a sectional view of a still further modification of upper and lower support for compensating rollers taken on line 22—22 of Figure 23;

Figure 23 is a top plan view of the modification of Figure 22;

Figure 24 is an enlarged longitudinal sectional view of one end of a supporting unit of a compensating roller, taken on line 24—24 of Figure 22;

Figure 25 is a substantially transverse sectional view of a means of attaching the supporting unit to an upright post of a standard taken on line 25—25 of Figure 22;

Figure 26 is an elevational view of the mandrel section of Figure 22 showing plate reversed to handle the tubular material travelling in clockwise direction;

Figure 27 is an elevational view of a mandrel section and two sets of feed and pressure rollers capable of adjustment from clockwise to counter-clockwise direction and to intermediate angular positions;

Figure 28 is a detail elevational view of the supporting means for the pressure rollers of Figure 27;

Figure 29 is an elevational view of the supporting means, showing angular adjustment thereof in dotted lines;

Figure 30 is an elevational view of the back of a mandrel section showing two sets of feed rollers and means for driving same;

Figure 30A is an elevational view similar to that shown in Figure 30 except that the section is adjustable only for change in direction of bias feed;

Figure 31 is a front elevational view of a mandrel in which each section is provided with a cutting element, in addition to the feed and pressure rollers, to effect a bias cut at opposite sides of the material and thus to produce bias strips;

Figure 32 is an elevational view of mandrel composed of a single section and a single feed and pressure unit, to feed the material either clockwise or counter-clockwise;

Figure 33 is an end elevational view of the same for operating the same at any angle of adjustment;

Figure 34 is a front elevational view of a single mandrel section showing two feeding units arranged in a V-formation and capable of feeding the material over the mandrel in either a clockwise or a counter-clockwise direction;

Figure 35 is an end elevational view of the same;

Figure 36 is an elevational view of a mandrel section showing a modified feed unit;

Figure 37 is side elevational view of a sectional mandrel and means to enlarge the latter;

Figure 38 is a top plan view of the same;

Figure 39 is a top plan view of two V-shaped mandrel sections;

Figure 40 is a front elevational view of the same;

Figure 41 is a top plan view of two U-shaped mandrel sections;

Figure 42 is a front elevational view of the same;

Figure 43 is a top plan view of two three-sided mandrel sections;

Figure 44 is a top plan view of two four-sided mandrel sections;

Figure 45 is a front elevational view of the same;

Figure 46 is a substantially transverse sectional view of a substantially flat curved mandrel section showing the use of long pressure and feed rollers;

Figure 47 is a substantially transverse sectional view of a mandrel having sections each thereof comprising flat sides joined by a curved mid portion and showing the use of long pressure and feed rollers;

Figure 48 is a side elevational view of a mandrel section embodying a double V-shaped feed arrangement;

Figure 49 is a substantially transverse sectional view of mandrel sections each having a very slightly curved outer profile to accommodate relatively long feed and pressure rollers.

In the arrangement about to be described, the tubular material to be cut is fed downwardly, while rotating, from an overhead roll carried in a revolvable support, which may be of any of the well known structures used for the purpose, and which therefore, will not be illustrated or described in connection with the present invention.

Referring to the drawings and particularly to Figures 1 to 15, inclusive, the invention comprises a flat bed plate 10, which supports the entire bias cutting mechanism, and which is provided at opposite ends of the plate with upright standards 11 and 12, see Figures 1, 2, 3 and 5. The standard 11 is provided at its mid portion with a bore 13 and at its upper end with a yoke portion 14, the arms of which are bored to receive the stud pins 15 of a bearing sleeve 16. The other standard 12 is at the opposite end of the plate 10 and comprises an upright portion provided with a fixed bearing 17 substantially alined with the bearing sleeve 16 and an arcuate shaped upward projection 18 having a bearing 19 directly over the axis of the bearing 17 and at right angles thereto. Loosely mounted in the bearings 16 and 17 is a driven shaft 20 which projects beyond the bearing 17 to receive a groove pulley 21. Mounted upright on the base of the bearing standard 12 and in front of the upright portion thereof is a supporting standard 22 which is provided with a bore 23 receiving one end of a fixed guide shaft 24, the opposite end thereof being fixed in the bore 13 of the standard 11. According to this arrangement the rotary driven shaft 20 and guide shaft 24 are disposed directly over one another, as illustrated in Figures 1 and 2.

The guide shaft 24 is a fixed rod, which guides a carriage 25 longitudinally of the plate 10, the carriage 25 comprising a platform 26 provided with depending bearings 27 at opposite ends to embrace the rod or shaft 24, and depending side portions 28 provided with axles 29 and wheels 30 which traverse the surface of the plate 10. This construction allows the carriage 25 to be moved longitudinally of the plate 10 between the standards 11 and 12. A pointer 31 is carried at one side of the carriage 25 and is disposed to register with the graduations of a scale 32 arranged on the plate 10 along the path of movement of the pointer. The carriage 25 may be fixed in any position along the guide rod 24 by means of a set screw or clamp 33 adjustable in the platform 26 against the rod 24. The set screw 33 is provided with a handle or grip portion 34 to facilitate manipulation of the screw from the platform.

The carriage 25 carries what will be referred to hereinafter as the movable mandrel section while the plate 10 supports the so-called fixed mandrel section.

The platform 26 of the carriage 25 is substantially the width of the plate 10 and upon its upper surface adjacent the inner corners are adjustable sockets 35 which support upright tubular standards 36 for the movable mandrel section. The support for the fixed mandrel section comprises sockets 37 mounted on the plate 10 adjacent opposite sides of the standard 12 and adapted to support upright tubular standards 38 similar to the standards 36.

The carriage 25 also supports a third socket 39 at its outside corner to support an upright tubular standard 40 and an upright bracket 41 in the mid section of the platform 26, the bracket 41 having an opening 42 at the proper point to accommodate the passage of the shaft 20. The bracket 41 is angular at its upper end to provide a vertical bearing 43 for a shaft 44, the lower end thereof being provided with a miter gear 45 in mesh with a miter gear 46 keyed to the driven shaft 20 so as to cause the miter gear 46 to turn with the shaft and to allow longitudinal movement thereof with the carriage 25. The shaft 44 is connected to the operating mechanism of the movable mandrel section in the manner hereinafter described. The operating mechanism of the fixed mandrel section is driven by means of a miter gear 47 fixed on the shaft 20 adjacent the bearing 17 and meshed with a miter gear 48 on the lower end of an upright shaft 49 journalled in the bearing 19 of the upper end of the standard 12.

The upright tubular standards 36 and 38 are open at their upper ends to receive the depending legs 50 and 51, respectively, of the movable and fixed mandrel sections. The legs 50 and 51 are rods which fit slidably in their standards so as to allow for upright adjustment of the mandrel supporting equipment to accommodate the larger diameter materials; the wide bias cut strips of which, as hereinafter described, require a greater height from which to be discharged from the bias cutter and into rewinding position, than is necessary with the smaller strip being discharged from the normal size tubular materials. The rods 50 and 51 are fixed to their standards, after adjustment, by means of set screws 53, which are carried by the standards adjacent their upper open ends and which tighten against the rods to hold them firmly against movement.

The rods 50 forming an extension of the upright standards 36 of the movable mandrel section project above the standards a distance sufficient to receive and support the mandrel proper designated 54. The mandrel 54 in its simplest form comprises a flat, preferably square, board or plate, coinciding at opposite upright sides with the outer faces of the rods 50, and being provided with fastening means, e. g. screws 55, which secure the plate to the rods. In order to change the bias cut from clockwise to counter-clockwise, as hereinafter described, the plate 54 may be turned about on its axis for approximately 90 degrees and again fastened to the rods. This adjustment is accomplished by providing suitable screw openings 56 along each edge of the plate 54 to accommodate the screws 55. The opposite upright sides of the flat mandrel section 54 are provided with half-round strips 57, the flat faces of which abut the surfaces of the plate sides and rods 50, while the rounded surfaces are outside and facilitate easy movement of the tubular material in its spiral downward travel over the mandrel. The upper side of the mandrel plate 54 carries a slightly tapered shoe 58, which is adapted to enter and spread the downwardly moving tubular material and guide it over the mandrel section.

The fixed mandrel section is substantially the same as regards the mandrel proper as the movable mandrel section, and comprises the flat square board or plate 59 fixed to the rods 51 by screws 60 and provided with half-round side pieces 61 and an upwardly projecting tapered shoe 62.

Thus far the present invention is described as consisting of a base, a fixed and a movable supporting standard and flat mandrel sections extensibly carried at the upper ends of the standards and adapted to enter the downwardly moving tubular material and spread it so as to enable the same to be moved in a downwardly directed spiral about the flat mandrel plates 54 and 59.

The means used in the present instance to feed the material over the mandrel sections in a downwardly spiral direction, as illustratively exemplified in Figures 1 to 15, inclusive, comprises a feed roller 63 for plate 54 and a feed roller 64 for plate 59. Each feed roller is composed of rubber, metal or other suitable traction material and its longitudinal dimension is great enough to afford ample contact with the back of the material traversing the mandrel section 54 to insure a proper feeding condition. The opposite ends of the feed roller 63 are provided with stud shafts which are journalled in bearings 65 disposed on the back of a rotary adjustable disc 66. A disc 66 is mounted in a circular opening 67 in the mid portion of each of the plates 54 and 59 and its opposite faces are flush with those of its plate. Each disc is provided with a diametrically disposed slot 68 having tapered side walls 69 and accommodating the portion of its roller 63 or 64, which projects towards the outer face of the disc with which it is substantially flush. In Figure 6 the roller 63 and adjacent parts are illustrated as they appear when viewing them from the inner side or the space between the mandrel sections. The disc 66 and the feed roller 64 are shown as adjusted to the position which enables the material to be fed downwardly and spirally in a clockwise direction over the outer face of the mandrel sections.

The lower end of the feed roller and its shaft carry a miter gear 70, which is in mesh with another miter gear 71 carried by bracket 72 attached to the disc 66. The miter 71 is connected by means of an universal joint 73' to a telescopic shaft 73 which projects downwardly at an angle of the perpendicular and is connected at its lower end to a second universal joint 74 connected to the upright end of the shaft 44. If the angle of the feed roller 64 is changed to effect a different degree of bias or to change from a clockwise feed to a counter-clockwise feed direction shown in dotted lines in Figure 6, the shaft 73 is capable of adjusting itself to any desired length and angle between its universal joints and still effectively drive the feed roller. It is to be noted, however, that in changing the angle of the feed roller beyond a certain point the miter gear 71 and its bracket 72 must be shifted on the disc 66 to the position shown in dotted lines in Figure 6.

The material A traversing the mandrel section 54 is pressed into close contact with the surface of the feed roller 64 appearing in the opening or slot 68 by means of a pressure roller 75, see particularly Figure 7. The pressure roller 75 is similar in length and diameter to feed roller 63 and is constructed preferably of rubber or other suitable material capable of exerting yieldable rolling pressure against the feed roller 63. The pressure roller is supported at its ends in a yoke 76, through the closed side of which a spindle 77 is loosely disposed, the ends thereof projecting beyond the ends to receive the coils of tension springs 78, each thereof having one end of its coil fixed to the spindle 77 and the other end engaging the arm of the yoke to yieldably urge the latter and roller 75 towards the feed roller 63. One end of the spindle 77 projects considerably beyond the yoke 76 and is carried for both longitudinal and rotary adjustment in a block 79. The spindle 77 projects downwardly at an angle and through a bore 80 in the block 79 and is fixed in adjusted position therein by means of a set screw 81. The block 79 is provided with a second bore 82 disposed at right angles to and spaced below the first bore 80 to receive therein the lateral arm 83 of a right angle supporting rod 84.

The arm 83 projects outwardly from the face of the mandrel section 54 and the block 79 is capable of both longitudinal and rotary adjustment over the arm 83 to which it is rigidly affixed by means of a set screw 85 after proper adjustment is effected. The supporting rod 84 telescopes into the upper end of the tubular standard 40, which, as previously explained, is supported upright on the carriage 25. A collar 86 is fixed to the rod 84 adjacent the elbow thereof and rests upon the upper end of the tubular standard 40 and the standard at this point is provided with a set screw 87 to rigidly affix the rod 84 in the standard 40 at any desired elevation. The support for the pressure roller 75 is sufficiently universal to enable the latter to be adjusted to the proper height and angle whereby the pressure roller will operate against and parallel to the feed roller 64.

It is to be noted particularly that change in direction of movement of the material over the mandrel sections, requires angular adjustment of the disc 66 with the feed roller 63 and of the pressure roller 75. The degrees of possible bias feed are calculated on a scale or graduations 88 marginally disposed about the outer face of the disc 66, which graduations are adapted to register with an arrow or pointer 89 on the face of the section 53 at the top of the opening 67. The disc 66 is fixed in any of its adjusted positions by means of a set screw 90 projecting radially of the opening 67 at the top of the section 54 and disposed in a threaded bore which opens into the peripheral edge of the disc. The set screw 90 is simply tightened against the disc 66 to hold it firmly in the section 54.

Referring now to the feed for the fixed mandrel section 51, see Figures 1, 3 and 4, it will be seen that there are certain parts which are the same as the corresponding elements of the movable mandrel section. For example, the plate 59 is provided with its feed roller 64, disc support 66 having the slot 68 and depending legs 51 telescopically supported in the upright tubular standards 38. The miter drive gears 91, 92 and bracket 93 are similar to the corresponding elements of the movable section and are operated through a universal joint 96, which is connected to the upright shaft 49.

A pressure roller 97, similar to pressure roller 75, is supported at the outside of plate 59, between the arms of a yoke 98, which is loosely carried on a spindle 99 and yieldably pressed to bring the pressure roller against the feed roller by means of springs 100. The spindle 99, in this arrangement, projects upwardly at an angle and its end is mounted in an opening 101 in a block 102, the spindle being adjustable both rotatably and longitudinally in the opening 101. A set screw 103 in the block 102 engages and fixes the spindle in any of its adjusted positions. The block 102 is provided with a second bore 104 disposed at right angles to the first and adapted to receive the lateral arm 105 of an upright supporting rod 106 which is telescopically supported in a tubular extension 107 of an upright supporting tubular standard 108. The block 102 is adjustable rotatably and longitudinally of the arm 105 and can be fixed in any adjusted position by means of a set screw 109.

The tubular standard 108 projects upwardly to an elevation slightly above that of the standards 36 and 38 and receives a T-shaped fitting 110, the extension 107 being screwed into the upper arm of the fitting, as illustrated in Figure 1. The telescopic rod 106 projects downwardly into the extension 107, through the fitting 110 and into the standard 108. This construction allows for the upright adjustment of the pressure roller 97.

The side or laterally projecting arm of the fitting 110 carries a shaft 111, which projects outwardly away from the outer face of the fixed mandrel 59, and which is provided with a longitudinal keyway 112. The shaft 111 is prevented from turning in the fixture by means of a set screw 113. Supported on the shaft 111 is the cutting mechanism which comprises a plate and bearing 114 embracing the shaft 111 and prevented from turning thereon by a key 115 projecting into the keyway 112. The angle of the plate 114 parallels the angular position of the feed and pressure rollers 64 and 97. The plate 114 carries the base of an electric motor 116, the shaft 117 of which has secured thereto a cutting wheel or disc knife 118. The plane of the disc 118 is disposed at right angles to the axis of the pressure roller 97 and at an elevation just below the latter so as to bring the material being fed by the rollers directly into the knife. The exposed edge of the disc knife 118 beyond the short sector exposed to the material traversing the mandrel section 59 is shielded by a guard 119 carried by a support 120 attached to the plate 114.

The details of construction pertaining to the fixed mandrel section 59 and cutting mechanism are illustratively exemplified in Figures 10, 11 and 12. The cutting edge of the knife 118 is spaced from the surface of the plate 59 and its disc 66 and operates in an elevator cutting female guide 121, which comprises a narrow strip of material having a threaded stud 122 projecting from its back surface and through a radial slot 123 in the disc 66, to receive a nut 124 adapted to clamp the guide to the disc 66. The strip forming the guide 121 comprises two parts, a dove-tailed section 125 carrying the stud 122 and a semi-round section 126 having its flat side provided with a dovetail groove 127 disposed longitudinally thereof to receive the section 125. The crown of the section 126 is provided with a longitudinal groove 128 in which the cutting edge of the knife disc 118 operates. The opposite ends of the elevator are round and taper off towards the back, as shown in Figure 10.

In operation the material traversing the fixed mandrel is drawn downwardly in a spiral direction and fed to the cutting disc 118 over the elevator guide 121. This construction allows the elevator 121 to adjust itself to an angular position of the knife disc 118. The elevator 121 is securely locked in position on the disc 66, because the tapered sides of the section 125 co-act with the sides of the groove 127 as the nut 124 is tightened on the stud 122 to clamp the elevator tightly to the surface of the disc 66. It is also to be noted that rotary adjustment of the disc 66 and angular adjustment of the elevator will give an almost complete field of angular adjustment for the elevator with respect to the cutting knife 118.

The construction described up to this point includes fixed and movable mandrel sections, the latter of which is adjustable towards and away from the former to accommodate the different sizes of tubular material to be cut. It has been found that to make a machine of this character entirely flexible as regards the variations in tube sizes, further means are necessary to compensate for such variations. One form of compensator means used for the purpose is illustrated particularly in Figures 1 to 4, inclusive, and 14 and 15, and comprises adjustable sets of rollers carried by the fixed mandrel supports.

The support for the compensators comprises a tie plate 129 disposed laterally of the machine beneath the lower side of the fixed mandrel plate 59 and is attached by means of screws or bolts to the upright tubular standards 38 and 108. On the inner sides of the standards 38 there are flat strips 130 projecting from the top of the standards to an elevation substantially midway of the height thereof. The strips 130 provide the support for a gear and guide box 131 and the means used to establish the support are bolts 132 projecting between the strips 130 and the box 131 and tubular spacing sleeves 133. It will be understood that it is preferable, although not absolutely necessary, to maintain the compensators at a plane equidistant between the two mandrels. The box 131 therefore is spaced the necessary distance from the fixed mandrel plate 59 by the bolts and sleeves which are of the proper length to properly position the compensators. If no spacing sleeves are used, the box is bolted directly to the strips as shown in dotted lines in Figure 3, and in full lines in Figure 4.

The gear and guide box 131, see Figures 1 and 2, comprises an elongated hollow structure having upright front and back walls 134, top and bottom walls 135, and a bottom plate 136 which is below the bottom surfaces of the walls 134 and is spaced from the bottom 135 and bridges the gap therebetween. The top surface of the top wall 135 is provided with spaced guide strips 137 running longitudinally of the box. Operating in the spaces under and over the top and bottom walls 135 are toothed racks 138 and 139, rack 138 being disposed to move longitudinally of one end of the box 131 while rack 139 operates longitudinally of the opposite end, the teeth of both racks being directed towards each other. The racks project beyond the center portion of the box and their teeth engage a pinion gear 140. The gear 140 is supported in bearings in the walls of the box and is provided with a square shank 141 extending beyond the wall on the outside to accommodate a crank used in rotating the gear and simultaneously projecting or retracting the racks 138 and 139. The outer end of rack 138 is flat and carries an upright tie pin 142 which is attached at its upper end to a slide plate 143 projecting into the space between the guide strips 137 and at its lower end in a second slide plate 144 slidably mounted in the space above the plate 136 in the bottom wall 135 of the box. Movement of the rack 138 in and out of the end of the box produces the same movements in the two slide plates 143 and 144, which as hereinafter described, carry the upper and lower compensator rollers on one side of the machine.

The lower rack 139 is flat at the outer end projecting from the opposite end of the box 131 and is provided with an upright tie pin 145, the lower end thereof being attached to the rack 139 riding in the space above the plate 136, while the upper end is attached to an upper slide plate 147 operating in the groove between guide strips 137 at the top of the box.

The upper slide plates 143 and 147 when completely retracted, as shown in full lines in Figure 4, bring the compensator rollers inside the web of tubular material traversing the mandrel sections. The upper plates 143 and 147, each supports an upright socket 148 in which the lower end of an upright shaft 149 is fixed. A cross-shaped fixture 150 is loosely mounted on the shaft 149 adjacent its lower end and a T-shaped fixture 151 is loosely carried at the upper end of the shaft at an elevation just above the upper ends of the mandrel plates 53 and 59. The arms of the fixtures 150 and 151 which project outwardly from the machine are provided with extensions forming the bearings 152 and 153 for the upper and lower ends of the upper compensator roller 154. The rollers 154 form separate mandrel sections since they virtually fill the gaps between the adjacent opposite side edges of the plates 53 and 59. In order to avoid a rigid mounting for each compensator roller 154, the latter is arranged to swing in an arc in the direction of movement of the tubular material. This function is made possible by means of the loosely mounted fittings 150 and 151, which carry in their arms, projecting inwardly of the machine, the lateral arms of a U-shaped rod 155 the closed side thereof being spaced from and parallel to the upright shaft 149. Midway the height of the fixed shaft 149 and secured thereto is one end of a flat spring 156, the opposite end bearing against the rod 155 and yieldably tending to swing the latter and the compensating roller 154 in a direction counter to the direction of travel of the material over the mandrel. A stop 157 is mounted upright on each upper slide plate 143 and 147 and is disposed in the path of arcuate movement of the roller 154 with its support to prevent the spring 156 from forcing the roller beyond its outermost position.

The upper bearings 152 for the rollers 154 allow the stud shafts 158 of the latter to project therethrough to receive and carry cone-shaped shoes 159 which project upwardly so that their tips are approximately on the same plane as that of the upper ends of the tapered shoes 58. The cones 159 and tapered shoes 58 facilitate opening the tubular material as the latter is drawn downwardly over the shoes and about the mandrel sections.

After the tubular material passes the cutting disc it becomes a continuous bias strip which continues to follow a downwardly spiral path about the machine until a point is reached where it projects off at a tangent and is picked up and rewound on a roll. In order to aid in this movement a second pair of compensating rollers 160 are arranged directly under the rollers 154, the adjacent ends of the sets of rollers being spaced from one another the space occupied by the gear box 131. In the spaces at opposite ends of the gear box 131 a semi-cylindrical shield 161 is mounted on suitable supports attached to the outer ends of the slide plates 143, as illustratively exemplified in Figure 1. The curve of the shields 161 is approximately that of the periphery of the rollers 154 and 160 and since the shields move with the latter, there will always be a continuous supporting surface for the bias strip traversing the space between the upper and lower rollers 154 and 160.

Referring to the lower set of rollers 160, the latter comprise cylindrical members having stud shafts 162 at opposite ends adapted to journal in the slide plates 144 at the upper ends and in brackets 163 at the lower ends. The rollers 160 are not driven and rotate freely in their bearings.

The rollers 160 are sufficiently long to extend to an elevation just above the operating mechanism at the base of the machine. Each bracket 163, as illustrated in Figure 9, comprises a cylindrical portion 164 embracing a standard 38 to which it is fixed by a set screw 165, and a lateral curved portion 166 with arcuate slot 167, in which the lower stud shaft 162 of the roller 160 is adapted to turn. The design and arrangement of the bracket 163 are such as to allow for vertical and lateral adjustment of the roller 160 to bring it into co-alinement with the upper compensating roller 154.

It has previously been described that one mandrel section is stationary and the other adjustable relatively thereto to accommodate various size tubular materials. To insure against movement of the movable section with respect to the fixed section after adjustment is made and while the tubular material is being operated upon to produce the bias strip, one or more locking means 168 are used, each thereof comprising spaced parallel bars 169 disposed laterally of the machine and bridging the upright standards 36, 38 and 40, one end of the locking means 168 being permanently fixed to the standard 38 and adjustably connected to the other standards 36 and 40 by clamping means 170, as shown in Figures 1 to 4.

The operation of the embodiment of the bias cutting machine illustrated in Figures 1 to 15 is as follows: Tubular material descends from an overhead supply to the cone-shaped shoes 159 and tapered shoes 53 which spread the material and guide it towards and about the mandrel sections. The opposite sides of the tubular material are engaged by the feed and pressure rollers 63—64 and 75—97 over their entire length, the rollers drawing the material downwardly in a spiral the pitch of which is determined by the angle of the rollers themselves. The material passing the pressure and feed rollers of the fixed mandrel section immediately moves over the elevator guide 121 and into the path of the cutter 118 where it is given its bias cut and continues to discharge from the machine in the form of a continuous bias strip.

Any adjustment in the degree of bias cut for the material is effected by rotation of the discs 66 in the mandrel plates 54 and 59 and if direction of bias cut is to be changed from clockwise to counter-clockwise or vice versa, the mandrel plates 54 and 59 are removed from their supports and replaced after being rotated 90 degrees as illustrated particularly in Figure 6.

The adjustment of the movable mandrel section 54 and the positioning of the compensators 154 with respect to the fixed mandrel section, as illustrated in Figure 4, will be determined of course by the size of the tubular material, which in some instances will move more easily and truly if the compensators are entirely withdrawn and the material is in contact only with the flat mandrel sections. In other instances the compensators must be disposed in their full extended positions in order to effectively handle the tubular material in its downwardly spiral travel.

As previously explained, the upright adjustable extensions 50 of the standards, affording elevated positioning of the mandrels, allow for wide tubular material, the bias strips of which require a greater height from which to be discharged than is necessary in the smaller tubular materials.

Figures 14 and 15 show a gear box 131 in which the upper and lower racks 171 and 172, respectively, differ from rails 138 and 139 in that the teeth of the former project only part way towards the center line of the rack while in the latter they project entirely across the racks. The racks 171 and 172 are arranged so as to allow independent adjustment thereof, i. e. one rack is movable with respect to the other. The independent adjustment is accomplished by utilizing two pinion gears 173 and 174, the former being in mesh with the teeth of the upper rack 171, while the latter engages the teeth of the lower rack 172. Pinion 173 is provided with a bearing socket 175 on its inner face and a square turning stud shaft 176 projecting from its outer face and bearing in the side wall of the gear box 134. Pinion gear 174 on its inner face is provided with a stud shaft 177 bearing in the socket 175 of gear 173 and a square shaft 178 on its outer face projecting through the opposite side wall of the gear box 131. A crank, not shown, may be affixed to either square shaft 176 or 178 to independently rotate either gear and impart longitudinal movement to the racks, thus bringing the compensating rollers to their desired positions with respect to the mandrel sections.

Figures 16 and 17 show a modified construction of flat mandrel sections, in which each regular section 54 and 59 is provided, at opposite upright sides, with extensions 179 in the form of flat pieces corresponding in thickness and height to the section 54 or 59. The extensions 179 are attached to their respective central section 54 and 59 by means of pegs 180 which project from the inner sides of the extensions and fit tightly in openings 181 in the sides of the sections 54 and 59. The central sections 54 and 59, it will be recalled, are capable of being rotated to accommodate clockwise and counter-clockwise feed of material and in order to permit the extensions 179 to be affixed to central sections in either of their positions, the four sides are provided with the openings 181 to receive the pegs 180. The use of the extensions 179 is to enable a bias cutting machine of this character to handle very large sizes of tubular material and in order to facilitate spiral movement of the latter over the mandrel sections the outer sides of the extensions 179 are provided with semi-cylindrical grooves 182 projecting to points short of the corners of the extensions and accommodating rollers 183. The ends of the rollers 183 are provided with short shafts 184 which journal in the end walls 185 of the grooves 182.

Figures 18 and 19 show a modified form of base support embodying therein means whereby the mandrel sections are adjustable with respect to each other.

The bed plate 10 in the modifications is substantially the same as that used in the previously described embodiment. The driven shaft 20 is supported at its opposite ends in standards 186 and 187, mounted on the bed plate 10. Standard 186 is provided with a pivotally mounted bearing sleeve 188 to receive one end of the shaft 20, the opposite end thereof being journalled in a bearing 189 forming the upper end of the standard 187. The shaft 20 is provided at its free end beyond the bearing 189 with a pulley 21, as in the previously described modification.

Two guide shafts 190 are supported at their ends in bearings 191 mounted on the base 10 and on opposite sides of the standards 186 and 187. Each guide shaft 190 is provided at its mid portion with a right and left screw section 192. The guide shafts 190 are rotated through sprockets 193 fixed to their ends and a chain 194 passing about the sprockets to a hand operated sprocket 195 which is rotatably mounted at the upper end of an upright projection 196 of the standard 186. The hand operated sprocket is disposed at approximately waist height so as to be conveniently disposed for operation.

Two carriages 197 and 198 are arranged in the space between the two standards 186 and 187 and they are provided to support the two so-called movable mandrel sections of the present invention, as distinguished from the fixed and movable sections of the previously described embodiment of the invention. Each carriage comprises a platform 199 having depending side plates 200 in which short axles 201 having eccentric portions which are mounted in the plates to carry the supporting wheels 202. Each carriage has four wheels 202, which run over the upper surface of the base plate 10. The platforms 199 span the shafts 190 transversely thereof and at an elevation slightly above that of the shafts. Depending from the underside of each platform are two pairs of blocks 203 and 204, the blocks of each pair being co-alined and provided with openings to loosely accommodate the guide shafts 190. The inner blocks 204 carry threaded sleeves 205 in their openings surrounding the shafts to traverse the threaded portions thereof. The sleeves 205 are prevented from turning in their blocks 204 by means of set screws 206, which are carried in the platforms 199 and blocks 204, as illustrated in Figure 19, and which may be operated to release or tighten the sleeves from accessible points on the platforms by hand grips 207 at the upper ends of the set screws.

In operation the carriages 197 and 198 are moved towards and away from each other by rotating the guide shafts 190 in one direction or the other, i. e., one set of sleeves 205 is engaged with the right screw threads and the other set with the left screw threads of the shafts and when the latter are rotated the carriages move in the direction of the threads. If it is desired to move one mandrel section with respect to the other section, the set screws 206 of one carriage are released from engagement with their sleeves 205 which simply rotate with the shafts 190 and the carriage remains stationary.

Carriage 197 corresponds substantially with the movable carriage 25 of the first embodiment and upon the upper surface of its platform 199 are arranged the bearing support 41, standards 36 and 40 and in its upright portion a bore 42 is provided to accommodate the driven shaft 20. The other carriage 198 replaces the fixed standard of the first embodiment and carries upon its upper surface the upright standards 208 and 209 which correspond, respectively, to standards 39 and 108 of the first embodiment, standard 209 being supported at one side of the carriage platform 199 in a bracket 210.

The purpose of relative adjustment of the carriages 197 and 198 is to separate the mandrel sections, so as to accommodate the particular widths of tubular materials to be cut into bias strips. The adjustment may be predetermined by utilizing a scale 211 arranged on the face of a lateral locking bar 212, which is fixed at one end to one of the standards 208 and arranged at its other end to slide through a strap 213 having a pointer 214 adapted to indicate on the scale 211 the distance separating the two mandrel sections. A set screw 215 in the strap 213 fixes the bar 212 to the standard 36 after proper adjustment is completed.

The present modification, as well as that first described, is provided with locking means whereby the movable section is fixed with respect to the fixed section or the two movable sections are fixed with respect to each other. The means used to affix the sections comprises spaced lateral rods 216 attached at their ends to the upright posts or standards 39, or 209, and adapted to project to the standards 36 and 40 to which they are releasably affixed by means of clamps 217 on the latter standards. Thus, when the relative adjustment of the two mandrel sections is taking place, the rods 216 simply slide through the clamps 217 which have been loosened. Then when adjustment is complete the clamps 217 are tightened and the two mandrel sections are prevented from further relative movement.

Figures 20 and 21 are views of a modified construction of the compensators and the support therefor. In this particular arrangement the compensators and their supporting structure are entirely independent of the mandrel sections and receive support directly on the base plate 10. The mandrel sections 54 and 59, the telescopic support 50 therefor, standards 36 and 38 and semi-round side pieces 57 are the same in this modification as the corresponding parts in the first described embodiment.

The new feature in this embodiment resides in the compensators which combine each upper and lower set of rollers into a single upright roller 218, as illustrated in Figure 20. There is a roller 218 for the two opposite sides of the machine and they are rotatably supported above and below their ends in lateral arms 219 of an X-shaped fitting 220. The fittings 220 turn freely on upright rods 221 closely adjacent the peripheries at the inner sides of the rollers 218 and disposed parallel thereto. The fittings 220 carry angle bars 222, one arm of each thereof being co-axial of the arm 219 and the other arm projecting parallel to the rod 221 and in the direction of its end. A flat spring fixed at one end to each end of the rod 221, presses against the outer arm of the angle bar 222 and tends to yieldably hold the compensator roller 218 directly outwardly of the space between the mandrel sections. The support for the compensator rollers 218 closely resembles that used with the short rollers 154—157 of the first embodiment described except that where the long or single roller is used it is supported at both ends. It is likewise necessary to provide an upper and a lower support for the upright rods 221. Such a support is provided by utilizing two gear boxes 223 and 224, the upper box 223 being disposed at an elevation of the upper portion of the mandrel plates, while the lower box 224 is arranged at an elevation just above the lower ends of the compensator rollers 218. The lower box 224 rests upon a pedestal 225 standing upright on the base 10, not shown, and the upper box 223 rests upon the upper ends of two spaced upright posts 226 which are attached at their lower ends to the top of the lower gear box 224.

Each gear box encloses a pinion gear 227 and upper and lower racks 228 and 229, respectively, which are provided with lateral arms 230 and parallel guide bars 231 extending outwardly to embrace the upright rods 221 adjacent opposite ends to support the same and impart thereto inward or outward movement to properly position the compensator rollers 218. The pinion gears 227 are supported on stud shafts 232 journalled in the opposite walls of the boxes, and the ends of the shafts 232 at one side are provided with sprocket wheels 233, the lower wheel having a crank handle 234. The two sprockets are connected by means of a continuous chain 235. Rotation of the sprocket wheels causes the sets of racks 228 and 229 to move relatively to each other, whereby the compensator rollers move simultaneously inwardly or outwardly to a position which fills out the tubular material traversing the outside of the mandrel sections as illustrated in dotted lines in Figure 21.

Figures 22 to 25 illustrate another embodiment of the present invention, wherein the compensator rollers and the support therefor may be either the construction of the first embodiment shown in Figures 1 to 15 or of the construction illustrated in Figures 20 and 21, and wherein the novelty resides in the addition of further rollers carried at the opposite sides of the mandrel sections to again aid in accommodating the wider tubular materials in their rotary spiral movement into and beyond the knife.

In the present embodiment the mandrel sections 54 and 59 are supported on the telescopic rods 50 in the pairs of standards 36 and 38, respectively, the standards at an elevation considerably below the mandrel plates being provided with brackets 236 adjustable longitudinally of the standards and provided with set screws 237, whereby the brackets are permanently attached to the standards. The brackets are arranged on the inside of the standards and each pair carries a tubular housing 238 which projects laterally of the pairs of standards and bridges the space therebetween, as illustrated in Figures 22, 23 and 25. A similar tubular housing 239 is attached to the inside of the upper end of each mandrel plate, as shown in Figure 24. The purpose of each housing is to carry the means for yieldably supporting upright rollers 240, running parallel to the standards 36 and 38, and being normally spaced slightly from the sides of the mandrel plates. This construction provides four rollers 240, as shown in Figure 23, which are provided at their opposite ends with stud shafts 241. The shafts are journalled in lateral arms 242 which project into the ends of the housings 238 and 239 and which are telescopically arranged at their inner ends in tubular sockets 243 supported centrally within the housings. The outer end of each housing is closed except for an opening accommodating the cylindrical stem of a flanged thimble 244, which is adjustably fixed to the midportion of the arm 242, and which is disposed with its flange yieldably held against the inner face of the closed end of the housing. The socket 243 is permanently mounted longitudinally of the housing and projects from opposite sides of a center plate 245 disposed transversely of the midportion of the housing. A helical spring 246 is arranged on each socket 243 and its arm 246' within the housing 238 and 239 so as to seat at one end against the plate 245 and to yieldably bear against the flange of the thimble 244. The arms 242 between the thimbles 244 and the journals for the rollers 240 are bent at right angles so as to bring the rollers in the same plane with mandrel plates.

In operation the normal tendency of the springs 246 is to yieldably urge the arms 242 and rollers 240 in an outwardly direction from the sides of the mandrel plates, and as a consequence, to take up the full width of the material regardless of variations in the width due to irregularities in the manufacture of the tubing. This take up is provided in addition to whatever take up the compensating rollers may afford, as shown in dotted lines in Figure 23. It is contemplated that the use of the rollers 240 as well as the compensator rollers will facilitate the spiral rotary movement of the material over the flat mandrels without allowing any drag to take place. It will be clear that adjustment of the thimbles 244 along the straight portions of the arms 242 will allow for greater or lesser spacing between mandrel sides and the rollers 240, whereby variations in the size of tubular material to be cut may be handled with no other adjustment in the bias cutting machine.

Figure 26 is a view of a flat mandrel plate 54 or 59, which comprises simply a square piece of flat material having its corners provided with screw holes 247 registering with threaded openings 248 in the supporting legs 50, and a feed roller opening or slot 249, the longitudinal axis of which intersects the angles at diagonally opposite corners of the square plate. The purpose of this construction is to show the simplest form of changing a mandrel to provide clockwise to counter-clockwise feed for the material. To effect the change in so far as the mandrel plate is concerned, screws 250 are removed and the plate is revolved in one direction or the other through 90 degrees. The holes 247 will then register with openings 248 in the legs 50 and the screws may be replaced and tightened. By way of example, the feed roller slot 249 is shown in one position in full lines and in dotted lines in its other position.

Figures 27 to 30 illustrate a modified arrangement of feed and pressure rollers for a flat mandrel section in which a rotary plate 251, mounted in each of the flat mandrel plates 54 and 59, is provided with parallel oblique slots or openings 252 in which feed rollers 253 are mounted for rotation in bearings 254. The inner ends of the rollers 253 carry sprockets 255 which are connected by a sprocket chain 256 as illustrated in Figure 30. The lower roller 253 at its opposite end is provided with a miter gear 257 which is in mesh with a second miter gear 258 supported in a bracket 259 attached to the plate 251. The gear 258 is keyed to a shaft turning in the bracket 259 and at its lower end the shaft carries a universal coupling 260 attached to the upper end of either telescopic shaft 95. When changing the direction of feed or the degree of bias at which the material moves it will be necessary to change the position of the plate 251 and bracket 259 to the dotted position in Figure 30, i. e. clockwise or counter-clockwise, or to change the degree of bias the bracket is changed and gears of the proper angle must be substituted for the regular miters. In this manner, the full range of direction and degree of bias cut can be regulated.

The pressure rollers 261 for the feed rollers 253 are mounted in stirrup-shaped holders 262 swingably carried on rods 263 which have springs 263' to urge the holders and rollers in the direction of and into contact with the feed rollers. As illustrated in full lines in Figure 27, the rods 263 are parallel and project upwardly at an angle across the outer face of the mandrel section and through openings 264 in the free ends of supporting blocks 265. A set screw 266 in each block is tightened against the rod 263 to fix it at the desired angular position. The blocks 265 are virtually arms projecting from stud shafts 267 projecting from T-fixtures 268 arranged one above the other in spaced relation on the standard 108. The arms or blocks 265 are adjustably arranged so as to be capable of supporting the rollers 253 at any angular position which will enable them to be parallel to and in rolling contact with the surface of the feed rollers 253. The standard 108 is provided with the T-fixture 110 below the fixtures 268 for the purpose of carrying the motor platform 111, motor 116 and cutting blade 118. The plate 251 carries the elevator guide 121 in the manner illustratively exemplified in Figures 10, 11 and 12.

In practice, the change from clockwise to counter-clockwise or vice versa, is effected by shifting the blocks or arms 265 and motor fitting 110 to the opposite side of the mandrel section as illustrated in dotted lines in Figure 27. The disc 251 is turned through an arc of ninety degrees and with it the feed rollers 253 which will assume the position shown in dotted lines in Figure 30. The bracket 259 for the miter gear 258 must be changed to the dotted position of Figure 30 in order to insure proper meshing of the miter gears 257, 258. The telescopic shaft 95 is simply increased in length to reach the universal joint 260, which, because of the adjustment, is at a higher elevation. Any change in degree of bias cut is effected either by shifting the feed means within its limits of movement or by changing the supports for the feeding means to the opposite side of the mandrel. In this way a cut at any angle to the perpendicular of the mandrel is possible.

It will be noted that the seam in the tubular material to be cut follows a spiral line as the material is fed over the mandrel and it has been found that under certain conditions the bias cut should be made substantially at right angles to the direction of movement of the seam while under other conditions the cut may be made in the direction of the seam. In order to regulate the direction of the cut the direction of movement of the material is changed from clockwise to a counter-clockwise direction or vice versa, i. e., by changing the mandrel from clockwise to counter-clockwise position, a change in the direction of movement of the material is obtained as well as a reversal of the seam of the material and the direction of the threads.

Figure 31 shows a further modified construction in which two bias strips are cut simultaneously from a single length of tubular material. We accomplish the dual cuts by providing each of the two mandrel sections with a separate cutting element. Each section comprises a flat square plate 269 with a diagonal slot to accommodate a driven feed roller. A pressure roller 270, supported in a stirrup-like holder 271, is yieldably pressed in the direction of and in rolling contact with the feed roller by a spring 272 coiled about the rod 273 upon which the stirrup 271 is mounted. The rod 273 is carried adjustably in the block or arm similar to that used in the constructions previously described. A cutter blade 274 and elevator 275 are adjustably supported to cut the material as it feeds from the rollers.

The two mandrel sections are identical and the rollers and cutters are similarly supported so that as the material is fed spirally over the two sections, one cutter will sever the material on one side while the other cutter simultaneously severs the material at the opposite side, both cuts being made at the same angle and in the same direction; the result is, two bias strips leaving the mandrels at opposite sides of the machine. The dual cutting arrangement is particularly useful where especially wide material must be cut and the width of the bias strip must be relatively narrow.

Figures 32 and 33 show the use of a single mandrel plate 275 over which the material may be fed in either a clockwise or counter-clockwise direction. The plate 275 in this instance has a diagonally disposed slot 276 in which a feed roller 277 is mounted centrally thereof. The surface of the feed roller at opposite sides thereof projects through the slot 276 just beyond the adjacent surface of the plate 275 so as to contact and feed the material at either side of the plate. The drive for the feed roller comprises a pair of miter gears 278 housed in an opening in the corner of the section 275, one gear being keyed to the stud shaft of the roller while the other is keyed to a shaft upright in the opening and provided with a universal joint connection 279 of the upright drive shaft 95. The direction of rotation of the feed roller 277 will be governed by the direction of rotation of the shaft 20 in the base, as illustrated in Figure 5. A pressure roller 280 is disposed in yieldable rolling contact with the feed roller at one side of the plate, i. e. the pressure roller will be arranged on the side of the plate where the material is to be fed by the combined operation of the feed and pressure rollers. In order to shield the side of the feed roller on the non-feeding side of the plate from contacting the material and tending to move against the latter in a direction opposite to that at which it is being fed at the opposite or feeding side of the plate, we provide a shield 281 which comprises a relatively flat member detachably connected to the plate and bridging the exposed non-feeding surface of the feed roller. The cutting unit 282 will, of course, be supported to operate on the feeding side of the plate to cut the bias strip from the downwardly spirally moving material. This means that the supporting standards, not shown, will be disposed so as to arrange both the cutting unit 282 and pressure roller unit 280 in their operative positions at either side of the mandrel plate 275. On one side of the plate the feed roller may feed the material in a clockwise direction to the cutter by setting up the proper drive connection in the base, while if the roller is exposed to the material at the opposite side by transferring the shield 278, it will feed it in a counter-clockwise direction to the cutter by changing the direction of drive to the roller, thus making it practical to use a single mandrel and a single feed unit to move the material over the mandrel in either one of the two directions.

It is further contemplated that by mounting a single mandrel unit 275 on each pair of upright standards 36 and 38, and the feed roller 277 of one section connected to shaft 73 and the other feed roller of the other section to shaft 93, two separate tubular lengths of material may be accommodated with the result that two continuous bias strips can be produced. The directions the two tubular materials are fed, i. e. clockwise or counter-clockwise, may be the same or opposite depending upon the setting of the gears 45 and 46 as shown in Figure 5. In order to drive shaft 73 in a direction of rotation opposite to that of shaft 93, miter gear 46 is changed from the position shown in full lines to that illustrated in dotted lines. Thus shaft 20 will drive the upright shafts 73 and 93 in opposite directions.

Referring now to Figures 34 and 35, the idea of a single mandrel unit is further developed to the point where the tubular material traversing the section is fed on both or opposite sides of the single mandrel. The single mandrel in this instance comprises a hollow section 283 supported on the legs 50 and provided with two slots 284 in each side wall, the slots in each wall being in V-formation and in register with the corresponding slots of the other wall. Suitable bearings are arranged inside the section 283 and at the ends of the slots 284 to carry a pair of feed rollers 285. The rollers at their adjacent ends are operatively connected by a pair of miter gears 286 which pass the rotary movement of the lower roller to the upper roller causing the two rollers to turn in opposite directions. As shown and described in connection with Figures 32 and 33, the feed roller 277 functions as a feeding unit on either side of the single mandrel section. The same condition prevails for rollers 285 in the V-formation wherein their opposite surfaces are just flush with or slightly beyond the adjacent surfaces of the side walls to contact the material to be cut.

As stated above, the material in this modification encircles the mandrel and is fed spirally at both sides of the section either clockwise or counter-clockwise. For example, the apparatus of Figures 34 and 35, is set to feed the material in a clockwise direction into the cutting unit 287. This means that an upper feed roller and a lower feed roller 285 are exposed respectively on opposite sides of the section and that their exposed surfaces are turning in a downwardly direction and at an angle to the perpendicular. Thus when pressure rollers 288 are disposed in rolling contact with the exposed surfaces of the feed rollers, and the opposite exposed surfaces of the upper and lower feed rollers are covered by shields 289, detachably secured to the side walls over the slots 284, the tubular material at opposite sides thereof will be engaged first by the upper feed and pressure rollers on one side and then by the lower feed and pressure rollers on the opposite side of the mandrel, and fed into the cutting unit 287. The result is a continuous strip of bias cut material being discharged from the mandrel beyond the cutting unit 287.

Figure 36 shows a modified embodiment of the feed rollers and drive therefor as applied to a mandrel section having the rotary center disc 290, which is provided with long parallel slots 291 disposed on opposite sides of a diameter of the center disc. A feed roller 292 is mounted in each slot 291 and when the disc 290 is turned about in the mandrel section, the rollers may be brought to any angle with respect to the perpendicular that is required to produce either clockwise or counter-clockwise bias cut or any intermediate degree of bias cut. One of the feed rollers is the driving member and carries at one end a miter gear 293 which is in mesh with a sun gear 294 mounted on a shaft 295 projecting from the disc 290. The shaft 295 carries a swinging angle bracket 296, which in turn carries a shaft 297 at right angles to the shaft 295. The shaft 297 is provided at its upper end with a miter gear 298 in mesh with the sun gear 294 and at its lower end carries one unit of a universal joint 299, the other unit being connected to the upright driving shaft 95. This construction allows the disc 290 to be moved through the required number of degrees to change direction or degree of bias without necessitating the resetting of the miter gear drive unit with respect to the disc. The driving roller 292 drives the second roller 292 by means of a chain and sprocket connection 300 at the ends of the rollers opposite the miter gear connection.

In order to accommodate the cutter unit which is not illustrated in this instance, the disc 290 is provided with sets of openings 301 along a diagonal line at right angles to the diagonal line between the rollers. In the set of openings 301 facing the feeding direction of the rollers is mounted a cloth elevator 121 of the construction illustrated in Figures 10 to 12 and over the elevator the cutting unit is supported in the manner described and illustrated in connection with the several embodiments of the present invention.

A suitable scale of graduations 302 are arranged along the arc forming a peripheral portion of the opening in the mandrel section in which the disc is turnable. An arrow or pointer 303 on the disc moves with the latter along the graduations 302 and may be brought into register with any of them to indicate and set the feed for the desired direction or degree of bias cut. The pressure rollers for the feed rollers 292 are not shown, but it will be understood that they are supported and operated in conjunction with the feed rollers in the manner already described.

Figures 37 and 38 show a means whereby the capacity of the mandrel is augmented to accommodate tubular material greater in diameter than the capacity of the mandrel alone. The mandrel 304 and its standard 305 may be the same as any of those previously described in this specification. The capacity of the mandrel is increased by adding an upright compensator rod 306 comprising a single piece of material having preferably a semi-round outer side over which the material moves to and from the mandrel, as it is fed into the cutting unit.

The compensator rod 306 stands upright alongside one end of a mandrel section or on a line running between two sections where double sections are used. The upper end of the rod is disposed at an angle to form a toe 307 which is substantially parallel to the end portion of the tapered shoe 58. The lower end of the rod is turned outwardly to form a foot portion 308 which rests upon and is attached to the base 10 or to the movable carriage 25. The foot 308 is adjustable with respect to the mandrel section so as to take up any slack in the tubular material resulting from its size being greater than the mandrel section alone can accommodate.

Figures 35 to 45 show various modifications of mandrel sections which embody more than one flat side and which accommodate feed rollers on one or more of the flat sides to feed the material spirally thereover.

The mandrel sections 309 of Figures 39 and 40 are V-shaped and are arranged with the open base sides facing each other. The sections may be supported so that one is movable and the other stationary or both may be movable relatively to each other. Opposite sides respectively of the two V-sections 309 are provided with slots and feed rollers 310 and pressure rollers 311. The feed and pressure rollers are transferable to the other sides to feed the material in the other bias direction.

The sections 312 of Figures 41 and 42 are practically U-shaped with their open ends facing each other. In this arrangement the four arms of the sections are provided with the inclined slots 313 for the feed rollers, which, as in the previous modification, are arranged in the openings or slots 313 of opposite sides of the sections depending upon the direction of bias to be cut.

Figure 43 shows the mandrel composed of two three-sided sections 314 in which each side is provided with feed roller openings 315, which are arranged in pairs as regards their direction of inclination to provide a plurality of bias cuts, the slots of each pair being disposed in diametrically opposite sides of the assembled mandrel. Feed and pressure rollers 316 are disposed in the slots of the pair in use to feed the material over the mandrel sections.

Figures 44 and 45 illustrate the same idea expressed in connection with the invention of Figure 43, except that the mandrel in this instance comprises two four sided sections 317. The opposed sides of the two sections having slots 318 are disposed at corresponding angles to form a pair adapted to accommodate the feed rollers 319.

Figure 46 illustrates in section a mandrel comprising sections 320, the outside profile thereof being practically a flat curve 321, which allows the feed roller 322 to be of a substantial length and still have the line of contact with the pressure roller 323 coincide with the surface of the mandrel section, i. e., the common tangent of the two rollers coincides with the outer surface of the section.

Figure 47 illustrates a mandrel made up of sections 324, the outside profile of each having substantially flat sides 325 joined by a curved mid portion. The feed and pressure rollers 326 and 327, respectively, have a common tangent which coincides substantially with the flat sides of each section.

Figure 48 shows a double V-shaped arrangement of feed rollers 328 in a mandrel section 329. In this arrangement alternate rollers on opposite sides are covered with shields 330 to expose two sets of rollers feeding in the same direction on the same side of the section. To change the direction of bias the mandrel is simply turned around and the cutting unit 331 shifted to take the material being fed.

Figure 49 illustrates in section a mandrel comprising slightly curved working surfaces 332, each section carrying a substantially long feed roller 333, the peripheral surface of which coincides approximately with the said curved working surface. A pressure roller 334 cooperates with each feed roller 333 and is supported in position in the manner already described and illustrated in connection with the other embodiments of the invention.

In the operation of the various embodiments of the present invention, the roll of tubular material to be cut into a bias strip or strips is placed in an overhead frame, not shown, and the end pulled down and about the upper tapered shoe 58 and if compensators are used the material embraces the cones 159 as well as the shoes. The material is placed between the feed and pressure rollers and the knife is started. Thereafter the motor drive on the platform 10 is set in motion to rotate the feed rollers and feed the material into the path of the knife.

It is assumed of course, that the mandrel sections are set to size before bringing the material down and about the sides. The different adjustments of the mandrel sections and their compensators comprising the present invention may be made to meet all possible sizes and grades of material and to cut one or more bias strips from the material as it moves in a spiral along the sections and into the knife or knives.

While the present specification and drawings describe and illustratively exemplify several embodiments of bias cutting machines, it is not to be limited to these details and specific constructions, since further changes and modifications may be made in the invention without departing from the spirit and scope of the invention in its broadest aspects. Therefore, it is desired to cover any and all forms and variations of the invention which come within the terms or scope of any one or more of the appended claims.

Having described my invention and the manner in which the same operates, what I claim and desire to secure by Letters Patent is:

1. In a machine for cutting material into bias strips, the combination of an adjustable sectional mandrel over which tubular material is spirally fed, feeding means operating within the mandrel sections to move the material spirally thereof, a knife for cutting said material to form a strip, and means adjustable with respect to the mandrel to increase the capacity thereof to accommodate material of various sizes.

2. In a machine for cutting material into bias strips, in combination, an adjustable sectional substantially flat mandrel over which tubular material is spirally fed, feeding means operating within the mandrel sections to move the material spirally thereof, a knife for cutting said material to form a strip, and means adjustable with respect to the mandrel to increase the capacity thereof to any predetermined amount to accommodate material of various sizes.

3. In a machine for cutting material into bias strips, the combination of a mandrel comprising sections over which tubular material is spirally fed, feeding means operating within the mandrel sections to move the material spirally thereof, a knife for cutting said material to form a strip, and means operating between and with respect to said sections and outwardly thereof to increase the capacity of the mandrel to any predetermined amount whereby to accommodate material of various sizes.

4. In a machine for cutting material into bias strips, the combination of a mandrel comprising sections having laterally extensible intermediate portions over which tubular material embracing the mandrel is spirally fed, feeding means operating within the mandrel sections to move the material spirally thereof, and a knife for cutting said material to form a strip.

5. In a machine for cutting bias strips, the combination of a mandrel comprising sections having feed means for spirally moving a tubular material over the sections, a knife for cutting said material to form a bias strip, and supporting means for the sections comprising telescopic standards to allow adjustment in the length thereof.

6. In a machine for cutting bias strips, the combination of a base, telescopic standards disposed upright on said base, mandrel sections supported on said standards, means for feeding tubular material spirally over said mandrel section, a knife for cutting said material to form a strip, and telescopic driving means operating the feeding means from said base.

7. In a machine for cutting bias strips, the combination of a base, a carriage adjustable on said base, a hanger for the base and another for the carriage, a driven shaft journalled in the two hangers, standards mounted on the base and others on the carriage, complementary mandrel sections carried on the standards, and adapted to carry tubular material, feeding means for the mandrel sections to move the material in a spiral over the latter, a driving connection between the feeding means and the said driven shaft and a knife supported to operate adjacent the feeding means to cut said material to form a strip.

8. A machine for cutting bias strips, as claimed in claim 7, including guide means for the carriage and means for locking the latter in any position along said guide means.

9. A machine for cutting bias strips, as claimed in claim 7, including a graduated scale on said base along the path of movement of the carriage, and means on the carriage to register with the graduations of said scale to indicate distances between mandred sections.

10. In a machine for cutting bias strips, the combination of a base having hangers at opposite ends, a conveyor screw journalled at its ends in the hangers, means for turning the conveyor screw, a driven shaft supported on the base, carriages movable over said screw towards or away from each other, power transmission means on each carriage connected to the driven shaft, supporting standards disposed upright on each carriage, mandrel sections supported on the standards and adapted to support a spirally moving tube of material, feeding means on each mandrel section to feed the tubular material in a spiral direction over the said sections, adjustable driving connections between the said driven shaft and the feeding means to operate the same, and a knife adjustably supported to operate adjacent the feeding means to cut said material to form a strip.

11. A bias cutting machine, as claimed in claim 10, including locking means between the said supporting standards to fix the positions of the same and those of the carriages with respect to each other.

12. A bias cutting machine, as claimed in claim 10, in which the carriages are provided with brackets embracing the screw shafts, threaded sleeves rotatable in the brackets and engaged with the screw shafts to move longitudinally thereof when the shafts are rotated, and means to lock the sleeves against rotation in the brackets.

13. A bias cutting machine, as claimed in claim 10, including manually operated means connected to said screws to rotate them from a remote point to move the carriages with respect to each other.

14. In a machine for cutting bias strips, the combination of a mandrel for supporting a tubular material, comprising feeding means for moving the material spirally over the mandrel and capable of adjustment to change the direction of movement of the material, and cutting means adjustable with respect to the feeding means to cut the material to form a strip.

15. In a machine for cutting bias strips, the combination of a mandrel for supporting a tubular material, comprising a plate having an opening disposed diagonally thereof, adjustable feeding means operating in the opening to move the material spirally over the plate, and supporting means for the plate to carry the same in a plurality of positions to allow for a change in direction of the opening and feeding means.

16. In a machine for cutting bias strips, the combination of a mandrel for supporting a spirally moving tubular material, comprising sections having feeding means for spirally moving the material, compensating means intermediate said sections to take up and compensate for material beyond the mandrel, and means to adjust the compensating means with respect to the sections, and a knife to cut the material to form a strip.

17. A bias cutting machine, as claimed in claim 16, in which the compensators comprise rollers, and the adjustable means therefor comprise oppositely projecting supports for the rollers and a rack and pinion connection for the supports to move the latter simultaneously in opposite directions to increase or reduce the capacity of the mandrel and rollers to meet the size of the material.

18. A bias cutting machine, as claimed in claim 16, in which the compensators comprise rollers, and the adjustable means for the rollers comprise oppositely projecting supports, having swingable end portions to carry the rollers, yieldable means to urge the swingable ends to hold the rollers against the direction of movement of material thereover, a guide and support for the supports, and a rack and pinion connection for the supports arranged in the guide and support to simultaneously move the rollers towards and away from each other.

19. A bias cutting machine, as claimed in claim 16, in which the compensators comprise rollers, and the adjustable means for supporting the rollers comprise yieldably and oppositely projecting arms between which the rollers are rotatably mounted.

20. A bias cutting machine, as claimed in claim 16, including tapered sections for the leading ends of the mandrel sections, and in which the compensators comprise rollers having tapered end portions adjacent the tapered sections of the mandrel to form means to open and enter the tubular material moving spirally over the mandrel.

21. In a machine for cutting bias strips, in combination, flat mandrel sections, means for supporting the sections and for providing relative adjustment thereof, compensating means interposed between the mandrel sections to cooperate with the latter in supporting a spirally moving tubular material, a supporting means for the compensating means including an adjustable arrangement to predetermine the relative positions of the compensator means with respect to the sections, and a knife for cutting the material to form a strip.

22. A bias cutting machine, as claimed in claim 21, in which said compensating means comprises upright rollers, and the supporting means comprises a central pedestal, gear boxes supported on the latter at elevations corresponding to the upper and lower ends of the compensator rollers, oppositely projecting racks adjustable in the gear boxes and supporting the rollers at their opposite ends, and pinions in said boxes engaging the racks to adjust the same.

23. A bias cutting machine, as claimed in claim 21, in which said compensating means comprises upright rollers, and the supporting means comprises a central pedestal, gear boxes supported on the latter at elevations corresponding to the upper and lower ends of the compensator rollers, oppositely projecting racks adjustable in the gear boxes and supporting the rollers at their opposite ends, and pinions in said boxes engaging the racks to adjust the same, and means for operating the pinions simultaneously.

24. In a machine for cutting bias strips, in combination, a mandrel for supporting a spirally moving tubular fabric, a knife for cutting the fabric to form a strip, means to feed the fabric from either side thereof, and means to prevent the fabric from being exposed to the feeding operation of the first means on one or the other side thereof, whereby the first means is in feeding relation with one side of the fabric to move it spirally over the mandrel.

25. In a machine for cutting bias strips, in combination, a flat mandrel section for supporting a spirally moving tubular fabric, a knife for cutting the fabric to form a strip, feed and pressure rollers to perform the spiral movement of the fabric, said feed roller being exposed for the feeding operation in opposite directions at opposite sides of the mandrel section, and means to cover one or the other of the exposed sides of the feed roller to allow the uncovered side thereof to feed the fabric in the desired direction.

26. A bias cutting machine, as claimed in claim 25, including means to drive the feed roller in opposite directions.

27. A bias cutting machine, as claimed in claim 25, in which the said mandrel section is provided with a diagonal opening in which the feed roller operates, the opposite peripheral surfaces of the roller being coincident with the opposite surfaces, respectively, of the mandrel section.

28. A bias cutting machine, as claimed in claim 25, in which said cover means comprises a plate detachably secured to the mandrel and arranged to bridge the surface of the feed roller to be made ineffective for feeding the fabric.

29. A bias cutting machine, as claimed in claim 25, in which the said mandrel section is provided with a diagonal opening in which the feed roller operates, the opposite peripheral surfaces of the roller being coincident with the opposite surfaces, respectively, of the mandrel section and in which the cover means comprises a substantially flat plate which is capable of being attached to either side of the mandrel section to bridge the opening and surface of the feed roller.

30. A bias cutting machine, as claimed in claim 25, including supporting means for the mandrel section which allows the latter to be reversed with respect to itself so as to bring the feeding side in operative relation to the knife.

31. In a machine for cutting bias strips, in combination, a flat mandrel section for supporting a spirally moving tubular fabric, a knife for cutting the fabric to form a strip, said mandrel comprising a flat plate provided with openings arranged in a V-formation, a feed roller mounted in each opening with its opposite peripheral surfaces coinciding with the opposite faces, respectively, of the flat plate, cover plates to be attached to the latter over alternate rollers at opposite sides thereof, and pressure rollers cooperating with the alternate exposed feed rollers at opposite sides to press the material against said feed rollers to spirally feed same in either of opposite bias directions over the mandrel.

32. A bias cutting machine, as claimed in claim 31, including an operative connection between the feed rollers, and a driving connection for one of the feed rollers.

33. In a machine for cutting bias strips, the combination of a mandrel over which tubular material is spirally fed, a knife for cutting said material to form a strip, and a female knife guide carried upon the mandrel over which the material is guided into the path of the knife.

34. In a machine for cutting bias strips, the combination of a mandrel over which tubular material is spirally fed, a circular knife for cutting said material to form a strip, the cutting edge of the knife being spaced from the surface of the mandrel, and a female knife guide and elevator adjustably mounted on the mandrel beneath the cutting edge of the knife to elevate the material and bring it into the path of the knife.

35. In a machine for cutting bias strips, the combination of a mandrel over which tubular material is spirally fed, feed and pressure rollers for moving the material over the mandrel in a spiral direction, a circular knife for cutting the material to form a strip, and a female knife guide and elevator adjustably mounted on the mandrel beneath the cutting edge of the knife and outwardly from the delivery of the feed and pressure rollers in the line of movement of the material to lift the latter into the path of the knife.

36. A bias cutting machine, as claimed in claim 35, in which the female knife guide and elevator comprises a length of narrow transversely convex material tapered off at opposite ends and provided with a longitudinal groove along the crown to accommodate the cutting edge of the knife, and means for attachably connecting the guide to the mandrel at right angles to the axes of the feed and pressure rollers.

37. In a machine for cutting bias strips, the combination of a mandrel over which tubular material is spirally fed and cut to form a strip, adjustable extensions for the sides of the mandrel to accommodate material larger around than the mandrel, and means for supporting the extensions comprising a pair of pinions co-alined and capable of rotary movements relatively of one another, rods having racks projecting oppositely of the pinions and having each of the racks engaging a pinion and supporting an extension, whereby the latter may be adjusted relatively of each other and with respect to the mandrel.

38. In a machine for cutting bias strips, the combination of a mandrel over which the tubular material is spirally fed and cut to form a strip, said mandrel comprising at least two sections, each thereof having angularly disposed flat working surfaces, opposed working surfaces thereof being employed to cooperate in the performance of feeding the material spirally over the mandrel sections.

39. In a machine for cutting bias strips, the combination of a mandrel over which tubular material is spirally fed and cut to form a strip, said mandrel comprising sections having their working surfaces substantially flat and being provided with angularly disposed slots, feed rollers operating in said slots and pressure rollers cooperating with the feed rollers to embrace the material and feed same over the mandrel, the lines of the material between adjacent surfaces of the feed and pressure rollers forming common tangents which coincide with the working surfaces of the sections.

40. In a machine for cutting bias strips, the combination of a mandrel over which tubular material is spirally fed and cut to form a strip, said mandrel comprising separate sections adjustably spaced from each other, and a rod disposed on a line projecting between and adjustable with respect to the sections and outwardly therefrom over which the material moves spirally from one section to the other.

41. In a machine for cutting bias strips, the combination of a mandrel consisting of a plurality of sections over which a tubular material is spirally fed, and cutting elements for the sections to effect bias cuts in the material to produce bias strips.

42. In a machine for cutting bias strips, the combination of a mandrel over which tubular material is spirally fed, rollers for the ends of the mandrel to allow the material to traverse the same, and cutting means for cutting said material to form a strip.

43. A bias cutting machine, as claimed in claim 7, including locking means to fix the positions of the supporting standards, and those of the carriages with respect to each other, said locking means comprising rods, and clamps arranged on each standard to clamp the rods to the standards in any relative position thereof.

44. A machine for cutting bias strips, as claimed in claim 7, in which said carriage comprises a plate having bearings, axles having eccentric portions journalled in said bearings, and wheels mounted on said axles.

45. In a machine for cutting clockwise or counter-clockwise bias strips, the combination of a mandrel over which tubular material is spirally fed, the selvage or seams of said material following a spiral line as the material traverses the mandrel, means for changing the direction of movement of the material and adjustable cutting means for cutting said material substantially at an angle to the seam or selvage to form a bias strip in which the threads of the material run clockwise or counterclockwise.

46. In a machine for cutting bias strips, the combination of a mandrel over which tubular material is spirally fed, comprising opposed sections, each thereof having flat sides joined by a curved mid portion, means on the flat sides to feed the material thereover, and cutting means to form a bias strip.

47. In a machine for cutting bias strips, the combination of a mandrel over which tubular material is spirally fed, comprising mandrel sections, each thereof having a straight flat inner surface and a convex outer surface, and cutting means to form a strip.

48. In a machine for cutting bias strips, the combination of adjustble mandrel sections, each thereof supporting a tubular material being fed spirally thereover, and a knife for each section for cutting said material to form a strip.

49. A machine for cutting bias strips, as claimed in claim 48, in which said sections are adjustable to change the direction of bias and the angular direction of movement of the material.

50. In a machine for cutting bias strips, the combination of a mandrel for supporting a tubular material, comprising feeding means for moving the material spirally over the mandrel in a clockwise or counterclockwise direction or in any intermediate direction, and cutting means adjustable with the direction of movement of the material to cut the same into a strip.

51. A machine for cutting bias strips, as claimed in claim 50, in which said mandrel is provided with an adjustable plate to carry the feeding means.

52. In a machine for cutting bias strips, in combination, a mandrel section for supporting a spirally moving tubular fabric, a knife for cutting the fabric to form a strip, said mandrel being provided with a plurality of openings arranged in zig-zag formation, feeding means for each opening capable of feeding the material from either side thereof, and means to prevent the fabric from being exposed to the feeding operation of alternate feeding means to bring about movement of the fabric in clockwise or counter-clockwise direction.

53. In a bias cutting machine of the character described, the combination of a mandrel for supporting tubular material, means for feeding said material spirally over the mandrel, and supporting means for the feeding means comprising blocks carrying the feeding means and being adjustably supported to move laterally and angularly with respect to the mandrel, and means to support the blocks.

54. A bias cutting machine, as claimed in claim 7, in which the feed means comprise feed and pressure rollers, stirrups for the pressure rollers, rods supporting the stirrups and adjustably carried by the blocks, and springs on the rods yieldably engaging the stirrups to press the pressure rollers towards the mandrel and against the feed rollers.

55. A bias cutting machine, as claimed in claim 50, in which said feeding means comprises pairs of feed rollers and pressure rollers engaging the material.

56. A bias cutting machine, as claimed in claim 50, in which said feeding means comprises pairs of feed rollers and pressure rollers engaging the material, and adjustable plates upon which feed rollers are carried.

57. A bias cutting machine, as claimed in claim 38, in which each section is V-shaped in transverse section.

58. A bias cutting machine, as claimed in claim 38, in which each section comprises a three sided member.

59. A bias cutting machine, as claimed in claim 38, in which each section comprises a four sided member.

60. In a machine for cutting bias strips, the combination of a mandrel over which tubular material is supported and spirally fed, comprising sections each of which has a barely appreciably curved working profile, feed and pressure rollers cooperating at each section to engage opposite faces of the material to feed same, said engagement taking place along a diagonal line extending across a substantial portion of the curved working profile of the section and coinciding approximately with the common tangent of the feed and pressure rollers, and cutting means to sever the material into a bias strip.

61. In a bias cutting machine of the character described, the combination of a plurality of mandrel sections, over each of which a separate tubular material is spirally fed in the same or opposite directions with respect to direction of feed of the material on the other section, means for feeding the material over each section in the predetermined direction, and cutting elements for cutting the materials into strips.

DAVID BALK.
JULIUS KATZ.
FRANK P. MAJOROS.